US008964051B2

(12) United States Patent
Toriumi et al.

(10) Patent No.: US 8,964,051 B2
(45) Date of Patent: Feb. 24, 2015

(54) IMAGING APPARATUS, METHOD FOR CONTROLLING THE SAME, AND STORAGE MEDIUM

(75) Inventors: Hiroshi Toriumi, Hiratsuka (JP); Takashi Morii, Yokohama (JP); Hidenori Shiba, Tokyo (JP); Keita Sonoda, Yokohama (JP); Masakazu Nakadokoro, Tokyo (JP); Shinji Kurokawa, Yokohama (JP); Shozo Endo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 13/243,767

(22) Filed: Sep. 23, 2011

(65) Prior Publication Data

US 2012/0092508 A1 Apr. 19, 2012

(30) Foreign Application Priority Data

Oct. 13, 2010 (JP) ................................. 2010-230725

(51) Int. Cl.
*H04N 5/232* (2006.01)
*H04N 5/225* (2006.01)
(52) U.S. Cl.
CPC ................................. *H04N 5/23293* (2013.01)
USPC ..................................... 348/211.3; 348/207.1
(58) Field of Classification Search
CPC ............................................. H04N 2201/0039
USPC ........ 348/207.99, 231.5, 222.1, 211.3, 207.1, 348/211.2
See application file for complete search history.

(56) References Cited

U.S. PATENT DOCUMENTS

| | | | |
|---|---|---|---|
| 7,103,267 B2* | 9/2006 | Miyake | 386/227 |
| 7,403,221 B2* | 7/2008 | Yamazaki et al. | 348/211.2 |
| 2001/0010549 A1* | 8/2001 | Miyake | 348/232 |
| 2004/0054609 A1* | 3/2004 | Takahashi | 705/35 |
| 2006/0025071 A1* | 2/2006 | Yamazaki et al. | 455/3.06 |

FOREIGN PATENT DOCUMENTS

| | | |
|---|---|---|
| JP | 11-102343 A | 4/1999 |
| JP | 11-298838 A | 10/1999 |
| JP | 2008-271325 A | 11/2008 |

* cited by examiner

*Primary Examiner* — Ahmed A Berhan
(74) *Attorney, Agent, or Firm* — Canon USA, Inc., IP Division

(57) ABSTRACT

An imaging apparatus capable of communicating with an external apparatus includes an imaging unit configured to photograph an object to acquire an image, an acquisition unit configured to acquire positional information, an addition unit configured to add the positional information acquired by the acquisition unit to the image acquired by the imaging unit, an operation unit configured to receive an instruction from a user, and a notification unit configured to notify before sending the image, when the operation unit receives an instruction to send the image to the external apparatus after the acquisition unit starts to perform processing for acquiring the positional information and before the addition unit adds the positional information to the image, the user that the positional information has not been added to the image which is instructed to be sent.

12 Claims, 18 Drawing Sheets

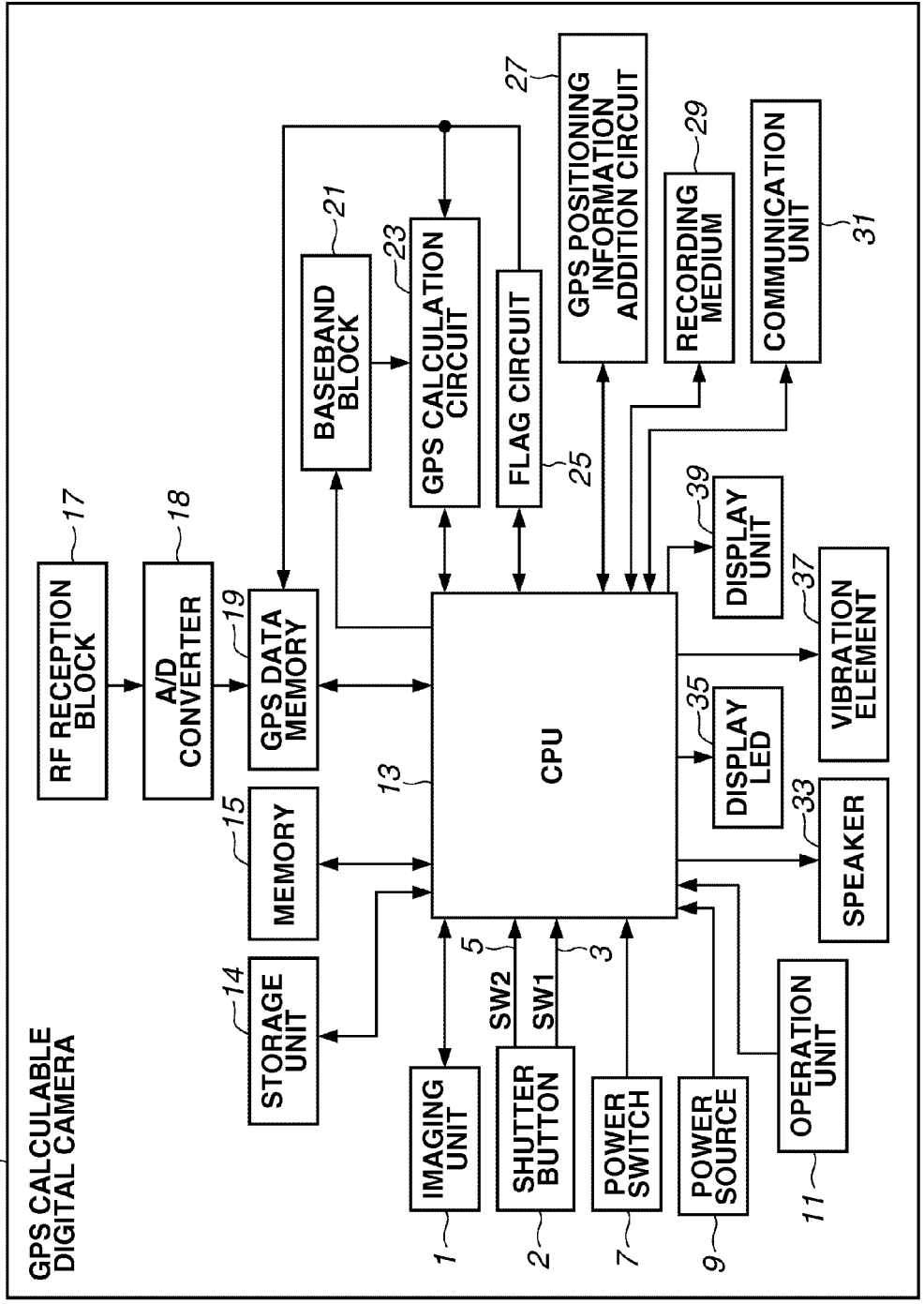

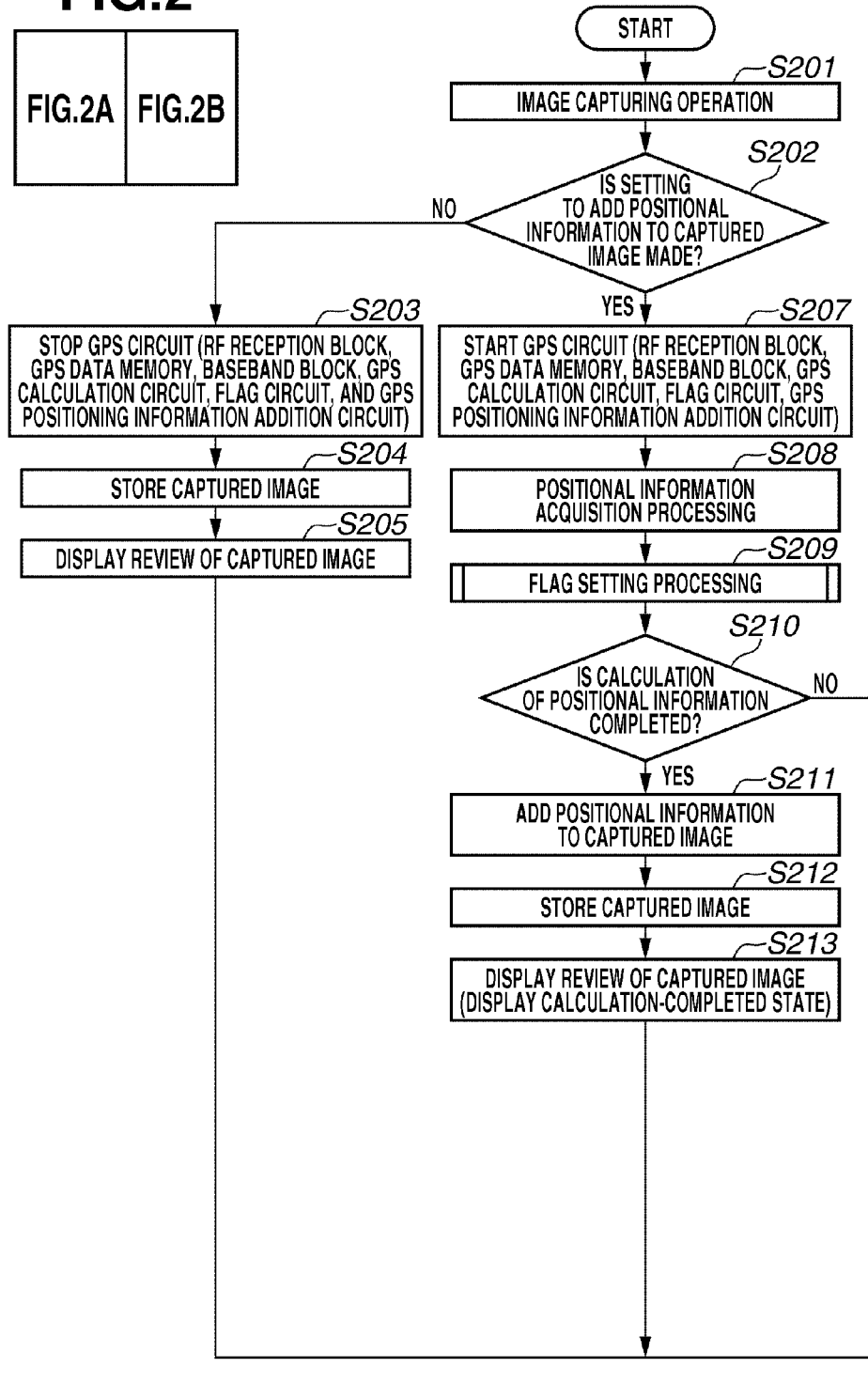

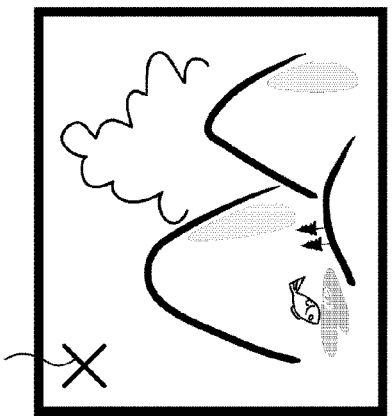
FIG.5A RECEPTION START WAIT STATE
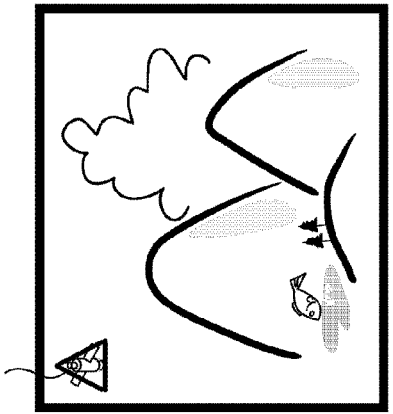
FIG.5B RECEPTION-IN-PROGRESS STATE
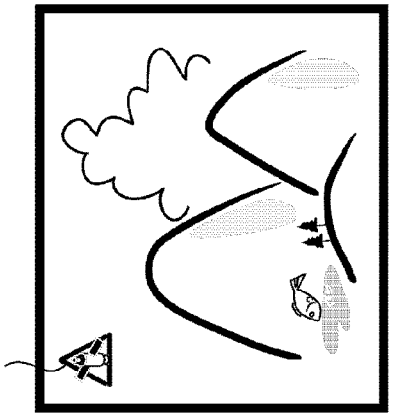
FIG.5C CALCULATION-IN-PROGRESS STATE
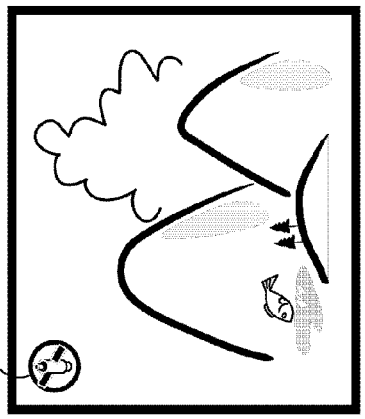
FIG.5D CALCULATION-COMPLETED STATE
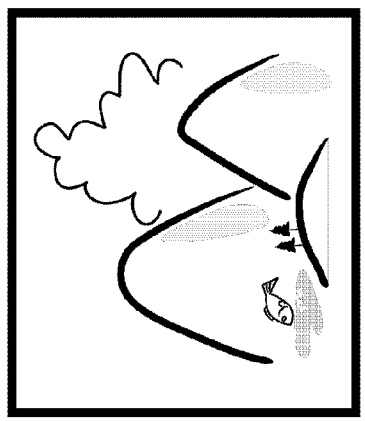
FIG.5E POSITIONAL INFORMATION NOT ADDED

CALCULATION-IN-PROGRESS STATE

RECEPTION-IN-PROGRESS STATE

RECEPTION START WAIT STATE

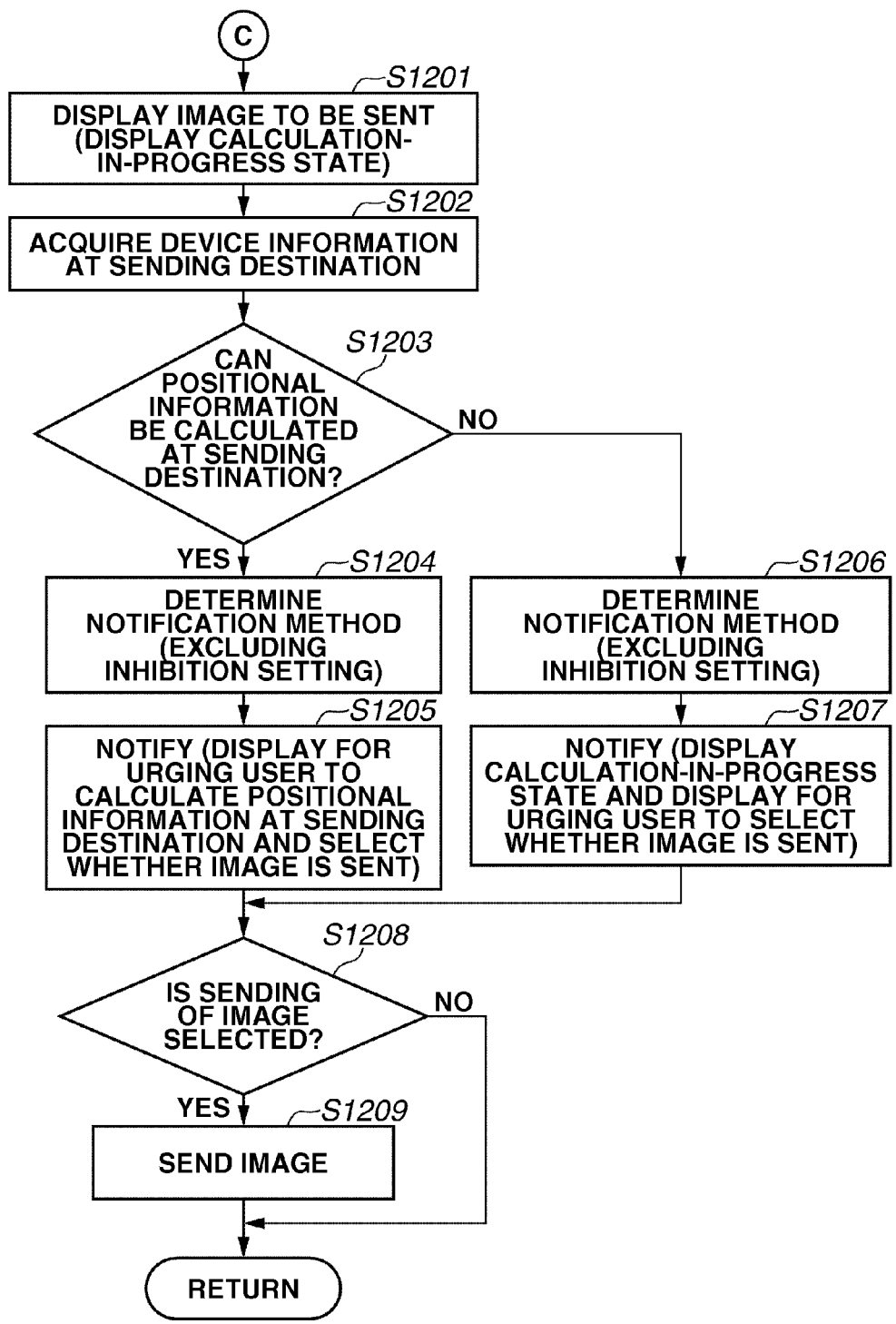

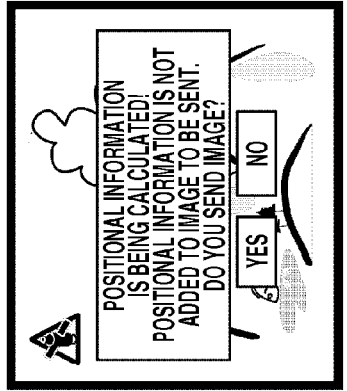
FIG.13A — RECEPTION START WAIT STATE
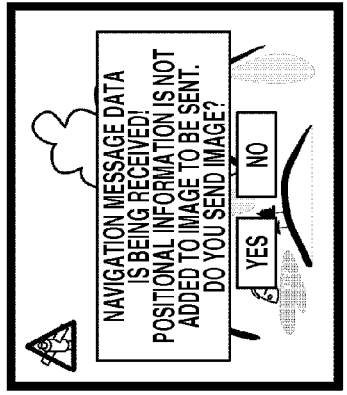
FIG.13B — RECEPTION-IN-PROGRESS STATE
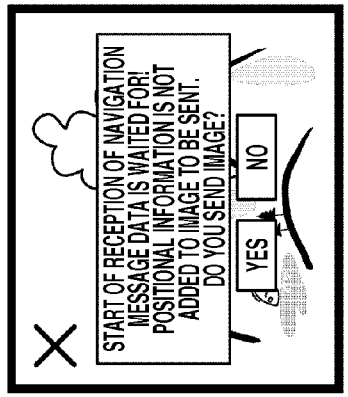
FIG.13C — CALCULATION-IN-PROGRESS STATE (CALCULATION IS IMPOSSIBLE AT SENDING DESTINATION)
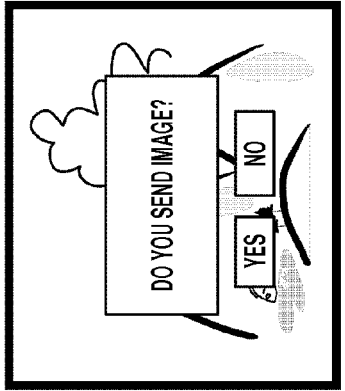
FIG.13D — CALCULATION-IN-PROGRESS STATE (CALCULATION IS POSSIBLE AT SENDING DESTINATION)
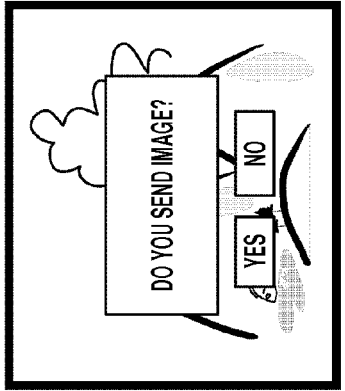
FIG.13E — CALCULATION-COMPLETED STATE
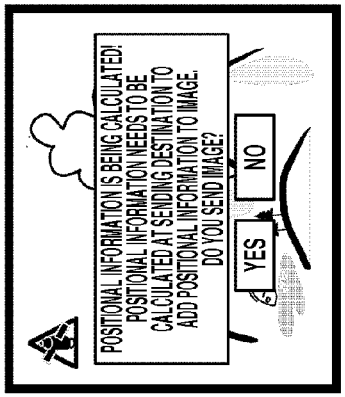
FIG.13F — POSITIONAL INFORMATION NOT ADDED

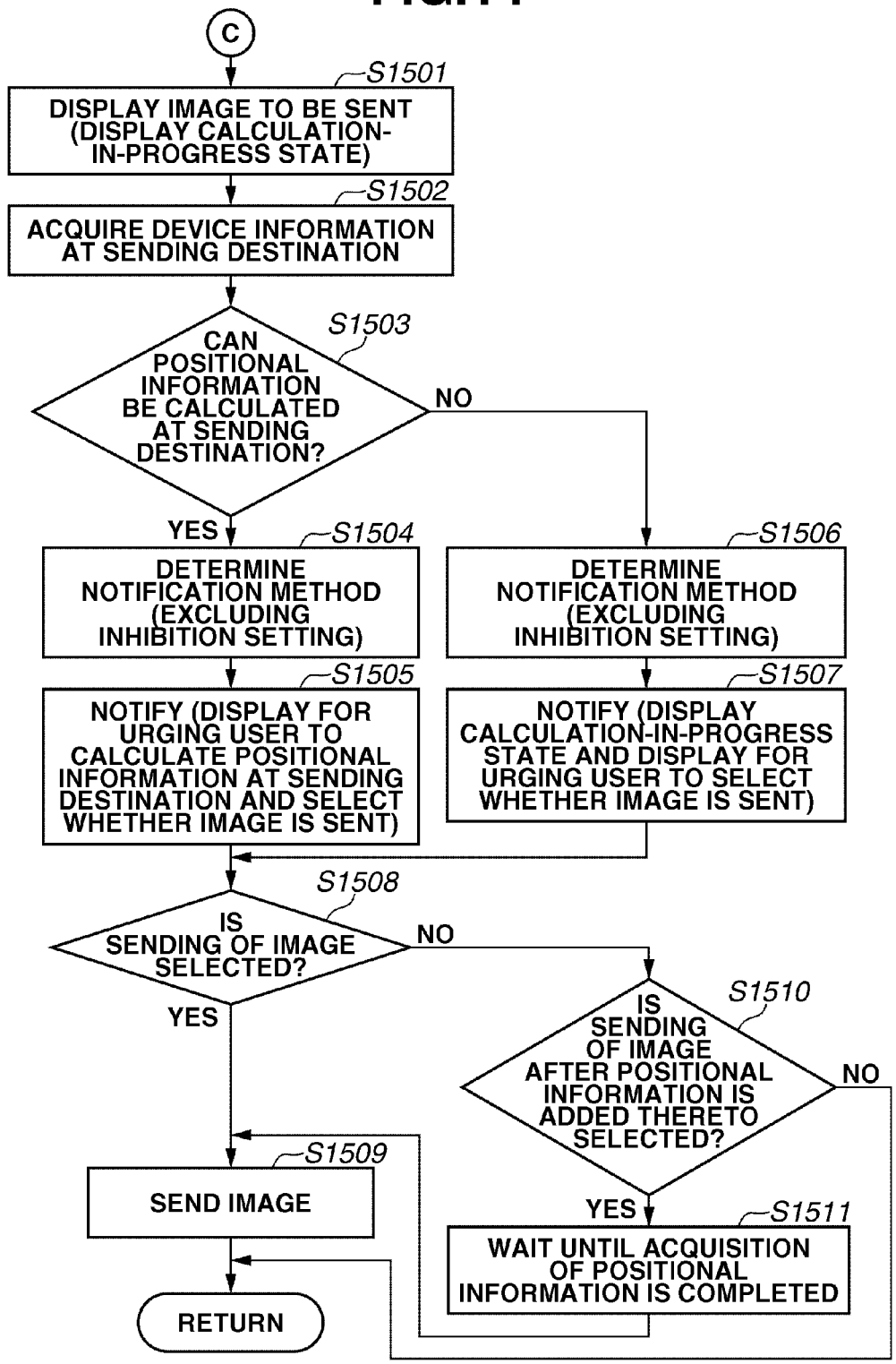

RECEPTION START
WAIT STATE

RECEPTION-IN-
PROGRESS STATE

CALCULATION-IN-
PROGRESS STATE
(CALCULATION IS IMPOSSIBLE
AT SENDING DESTINATION)

CALCULATION-IN-
PROGRESS STATE
(CALCULATION IS POSSIBLE
AT SENDING DESTINATION)

# IMAGING APPARATUS, METHOD FOR CONTROLLING THE SAME, AND STORAGE MEDIUM

BACKGROUND OF THE INVENTION

1. Field of the Invention

The present invention relates to an imaging apparatus, a method of controlling the same, and a storage medium.

2. Description of the Related Art

In recent years, a camera capable of adding positional information to an image using global positioning system (GPS) information received from a GPS satellite has been known. In order to add the positional information to the image, processing for acquiring the positional information is required. In the positional information acquisition processing, navigation message data such as almanac data and ephemeris data serving as one type of the GPS information is received. The positional information is calculated from the received navigation message data. The almanac data includes trajectory information relating to all satellites. The ephemeris data includes information relating to an accurate position of each of the satellites and information relating to the time when the satellite has sent a signal representing the navigation message data. In such a camera, the positional information acquisition processing is performed in response to an image capturing operation. If the satellite cannot be trapped or if an increase in a load of a central processing unit (CPU) is avoided, the positional information acquisition processing may be performed after the image capturing operation is completed.

Generally, a certain amount of time is required to acquire positional information. If the positional information acquisition processing is performed after the image is stored upon completion of the image capturing operation, therefore, the image may be sent to an external apparatus before the positional information is added thereto.

SUMMARY OF THE INVENTION

The present invention is directed to an imaging apparatus capable of notifying, if an image is sent to an external apparatus before positional information is added thereto, a user that the positional information is not added to the image to be sent.

According to an aspect of the present invention, an imaging apparatus capable of communicating with an external apparatus includes an imaging unit configured to photograph an object to acquire an image, an acquisition unit configured to acquire positional information, an addition unit configured to add the positional information acquired by the acquisition unit to the image acquired by the imaging unit, an operation unit configured to receive an instruction from a user, and a notification unit configured to notify before sending the image, when the operation unit receives an instruction to send the image to the external apparatus after the acquisition unit starts to perform processing for acquiring the positional information and before the addition unit adds the positional information to the image, the user that the positional information has not been added to the image which is instructed to be sent.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of an imaging apparatus according to a first exemplary embodiment.

FIGS. 5A to 5E illustrate review display in the first exemplary embodiment and the second exemplary embodiment.

FIG. 11 is a flowchart relating to notification processing in the second exemplary embodiment.

FIGS. 13A to 13F illustrate notification display in the second exemplary embodiment.

FIG. 14 is a flowchart relating to notification processing in a third exemplary embodiment.

DESCRIPTION OF THE EMBODIMENTS

Figure 2B:
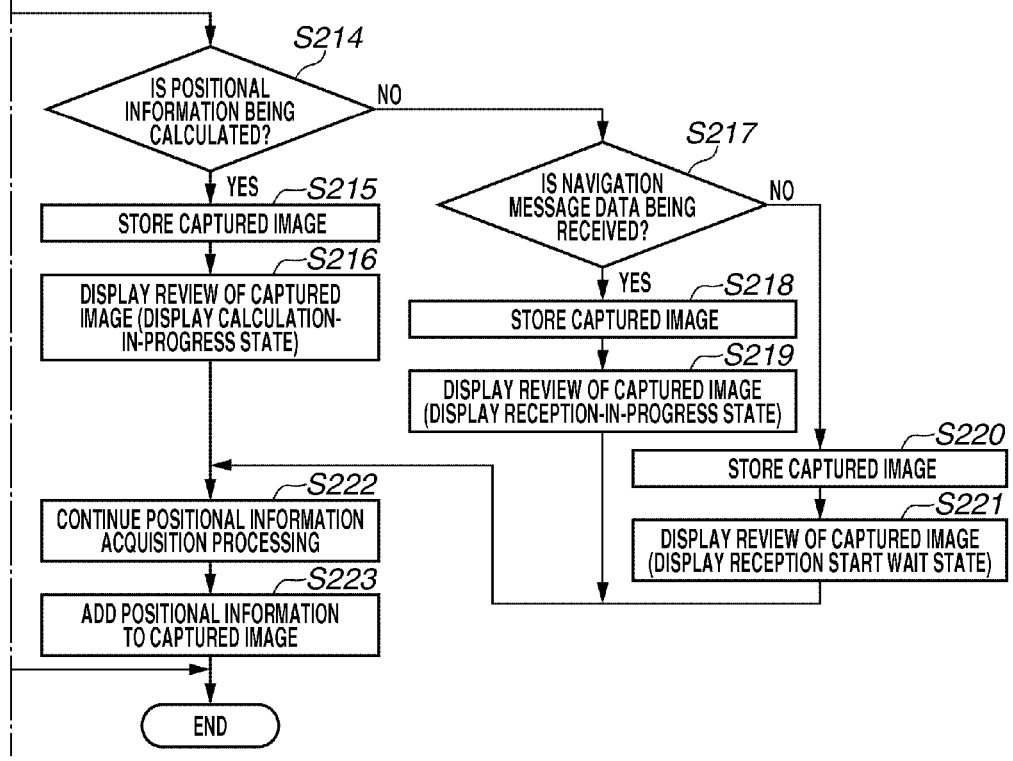
FIG. 2, which is composed of FIGS. 2A and 2B, is a flowchart relating to an operation of the imaging apparatus according to the first exemplary embodiment.

Various exemplary embodiments, features, and aspects of the invention will be described in detail below with reference to the drawings.

In a first exemplary embodiment, if a camera receives an operation for turning off power to the camera, the camera notifies a user of a reception/calculation state of GPS information. The GPS information reception/calculation state represents a stage in processing for acquiring positional information. The positional information acquisition processing is performed until a GPS circuit, described below, is started, navigation message data serving as a signal from a GPS satellite is received, and positional information is determined from the received navigation message data. In the present exemplary embodiment, the GPS information reception/calculation state is classified into four states, described below.

The first state is a state where the GPS circuit attempts to receive the navigation message data from the GPS satellite and before the GPS circuit starts to receive the navigation message data from the GPS satellite, which is referred to as a "reception start wait state".

The second state is a state after the GPS circuit starts to receive the navigation message data from the GPS satellite and before the receiving is completed, which is referred to as a "reception-in-progress state".

The third state is a state where the positional information is being determined from the received navigation message data.

In the present exemplary embodiment, the positional information is detected by calculation. Therefore, this state is referred to as a "calculation-in-progress state". In this state, the GPS circuit has finished receiving the navigation message data, and has not yet finished calculating the positional information based on the navigation message data.

The fourth state is a state where the positional information has already been determined. This state is referred to as a "calculation-completed state", similarly to the "calculation-in-progress state". In this state, the GPS circuit has finished calculating the positional information based on the navigation message data.

FIG. 1 is a block diagram illustrating an example of a configuration of a camera according to the present exemplary embodiment.

In FIG. 1, a camera 101 has the following components.

An imaging unit 1 is used when an object image is captured.

A shutter button 2 is mainly used to drive a shutter included in the imaging unit 1 when the object image is captured.

A first shutter switch (SW1) 3 is turned on while the shutter button 2 is being operated, i.e., is pressed halfway, and is used to start operations for automatic focus (AF) processing, automatic exposure (AE) processing, automatic white balance (AWB) processing, and electronic pre-flash (EF) processing.

A second shutter switch (SW2) 5 is turned on when the shutter button 2 has been operated, i.e., is fully pressed, and is used to start a series of processing operations for subjecting a signal read out of an image sensor to development processing and recording a developed image on a recording medium 29 in an image processing circuit in a CPU 13, described below.

A power switch 7 is used to turn on/off a power to the camera 101.

A power source 9 is used to operate the camera 101, and includes a primary battery such as an alkaline battery or a lithium battery, a secondary battery such as an NiCd battery, an NiMH battery, or a Li battery, and an alternating current (AC) adapter.

An operation unit 11 receives input of various types of instructions from the camera 101. The operation unit 11 includes a combination of one or some of a switch, a dial, a touch panel, a pointing by line-of-sight detection, and a speech recognition apparatus, and is used when a user operates/sets operations of the camera 101.

The CPU 13 controls the whole camera 101 according to an input signal and a program stored in a storage unit 14, described below. The camera 101 may be controlled by one piece of hardware, or may be controlled by a plurality of pieces of hardware sharing processing.

The storage unit 14 includes a nonvolatile memory such as an electrically erasable programmable read-only memory (EEPROM). The storage unit 14 stores a program for controlling each of the components of the camera 101 by executing the CPU 13, as described above. The program is used to implement each process in each flowchart, described below, in the present exemplary embodiment. This program may be rewritable.

A memory 15 is used as a work area for the CPU 13.

A radio frequency (RF) reception block 17 receives the navigation message data from the GPS satellite. The RF reception block 17 includes an antenna for receiving a signal from the GPS satellite, a filter for performing intermediate frequency processing, and a mixer. The RF reception block 17 subjects a received analog signal to the intermediate frequency processing using the mixer and the filter, and outputs the analog signal after the processing.

An analog-to-digital (A/D) converter 18 subjects the analog signal after the processing to A/D conversion.

A GPS data memory 19 is used to retain digital data output from the A/D converter 18. The GPS data memory 19 retains almanac data and ephemeris data. The almanac data is trajectory information received from a plurality of satellites and relating to all the satellites. The ephemeris data includes positional information relating to each of the satellites and time information representing the time when the satellite sends a signal.

A baseband block 21 demodulates the navigation message data retained in the GPS data memory 19 using a coarse/acquisition (C/A) code serving as a spread code specific to each of the satellites.

A GPS calculation circuit 23 calculates positional information from the plurality of navigation message data, which has been subjected to demodulation processing by the baseband block 21.

The RF reception block 17, the A/D converter 18, the GPS data memory 19, the baseband block 21, and the GPS calculation circuit 23 will be collectively referred to as a GPS circuit. The positional information is determined by the positional information acquisition processing by the GPS circuit.

The positional information acquisition processing will be described.

The positional information acquisition processing is started in a situation where the GPS circuit is ready to receive the navigation message data from the GPS satellite. The situation where the GPS circuit is ready to receive the navigation message data is a situation where the GPS circuit can demodulate the navigation message data. In this situation, when the RF reception block 17 receives a signal representing the navigation message data, a signal after the intermediate frequency processing is output to the A/D converter 18. The A/D converter 18 converts the signal after the processing into digital data, and outputs the digital data to the GPS data memory 19. The baseband block 21 demodulates a signal retained in the GPS data memory 19 using the C/A code. The GPS calculation circuit 23 calculates the positional information from the demodulated plurality of navigation message data. When the positional information has been calculated, the positional information acquisition processing ends. This processing is performed in step S208 illustrated in FIG. 2, described below.

A flag circuit 25 generates and holds a flag representing the GPS information reception/calculation state. The flag circuit 25 uses four types of values "00", "01", "10", and "11" as a value of the flag. In the present exemplary embodiment, a flag "00" represents the reception start wait state. A flag "01" represents the reception-in-progress state. The flag circuit 25 confirms the states by accessing the GPS data memory 19. A flag "10" represents the calculation-in-progress state. A flag "11" represents the calculation-completed state. The flag circuit 25 confirms the states by accessing the GPS calculation circuit 23. In processes illustrated in FIG. 2, described below, the CPU 13 detects the flag representing each of the states as acquisition information representing an acquisition state of positional information (a GPS information reception/calculation state). Thus, the user is notified of a content dependent on each of the states.

A GPS positioning information addition circuit 27 adds the flag held by the flag circuit 25 or the positional information calculated by the GPS calculation circuit 23 to an image according to an instruction from the CPU 13. The user can previously set whether the positional information is added to the captured image via the operation unit 11, for example, before the image capturing.

A recording medium 29 is used to record an image. The camera 101 may have at least a unit that accesses the recording medium 29. The recording medium 29 may be detachably attached to the camera 101, or may be incorporated into the camera 101.

A communication unit 31 is a wired communication unit or a wireless communication unit for communicating with an external apparatus.

A speaker 33 is an output destination of an audio signal. A display light-emitting diode (LED) 35 is used to notify various types of setting states of the camera 101. A vibration element 37 is used to notify various types of setting states of the camera 101. The vibration element 37 includes a vibration motor or the like. A display unit 39 is used for an electronic viewfinder, and includes a liquid crystal display or the like. The speaker 33, the display LED 35, the vibration element 37, and the display unit 39 are collectively referred to as a user interface unit. The CPU 13 controls the user interface unit, to notify information indicating whether the positional information is being acquired or has already been acquired. More specifically, the camera 101 according to the present exemplary embodiment can use the devices, to notify the information in various notification methods using sound, light, and vibration. The various notification methods are switched between ON and OFF. The notification method, which is set to OFF, is not used to notify the GPS information reception/calculation state, described below.

FIG. 2 is a flowchart illustrating an operation performed when the camera 101 captures an image in the first exemplary embodiment. Each of processes in the flowchart is implemented when the CPU 13 loads a program recorded in the storage unit 14 into the memory 15 and executes the program. Processes in each of flowcharts representing operations of the camera 101 are implemented in a similar method.

A flow illustrated in FIG. 2 is started in response to the CPU 13 receiving a shooting instruction.

In step S201, the CPU 13 first uses the imaging unit 1, to photograph an object, to acquire an image. This process may be performed in parallel with processes in steps S202, S203, S208, and S209, described below, and steps S301 to S307 illustrated in FIG. 3, described below.

In step S202, the CPU 13 then determines whether setting to add positional information to the image acquired from the imaging unit 1 is made. If the CPU 13 determines that setting to add the positional information to the image is not made (NO in step S202), the processing proceeds to step S203.

In step S203, the CPU 13 stops the GPS circuit. More specifically, the CPU 13 stops supplying power to the RF reception block 17, the GPS data memory 19, the baseband block 21, the GPS calculation circuit 23, the flag circuit 25, and the GPS positioning information addition circuit 27. If the GPS circuit has already been stopped, the process in step S203 is not performed, and the processing proceeds to step S204.

In step S204, the CPU 13 stores the image acquired from the imaging unit 1 in the recording medium 29.

In step S205, the CPU 13 displays a review screen of a captured image, as illustrated in FIGS. 5A to 5E, on the display unit 39. In this instance, the image is displayed on the display unit 39, and information relating to the GPS information reception/calculation state is not displayed, as illustrated in FIG. 5E. This process may be performed in parallel with the process in step S204. Then, the processing ends.

On the other hand, if the CPU 13 determines that setting to add the positional information to the image is made (YES in step S202), the processing proceeds to step S207. In step S207, the CPU 13 starts the GPS circuit. More specifically, the CPU 13 supplies power to the RF reception block 17, the GPS data memory 19, the baseband block 21, the GPS calculation circuit 23, the flag circuit 25, and the GPS positioning information addition circuit 27. If the GPS circuit has already been started, this process is not performed, and the processing proceeds to step S208.

In step S208, the CPU 13 performs the above-mentioned positional information acquisition processing. More specifically, the CPU 13 causes the GPS circuit to receive the navigation message data from the GPS satellite, and calculates positional information from the received navigation message data. The CPU 13 performs other processes in parallel with this process without waiting for completion thereof.

Figure 3:
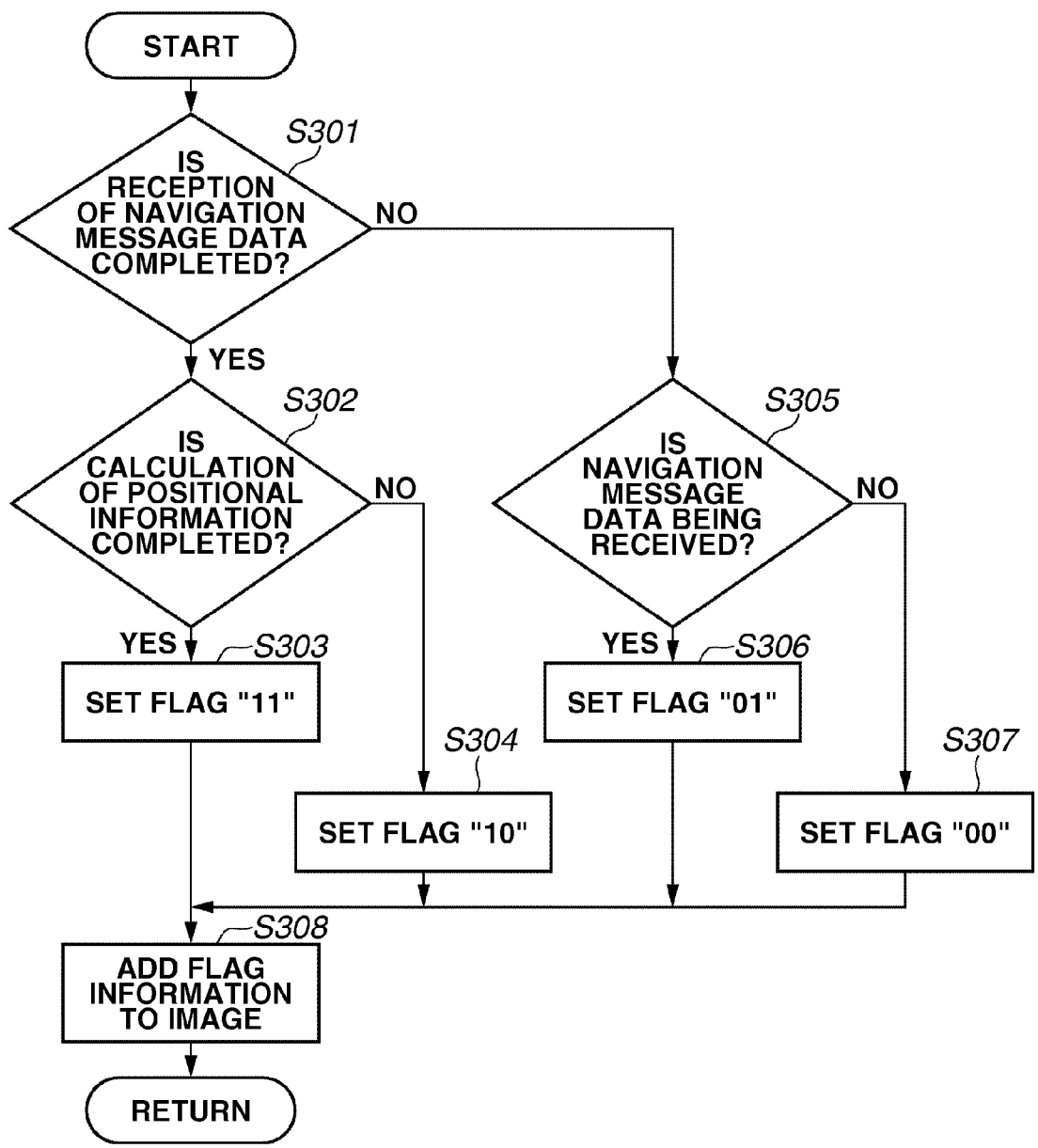
FIG. 3 is a flowchart relating to flag setting processing in the first exemplary embodiment and a second exemplary embodiment.

In step S209, the CPU 13 performs processing illustrated in the flowchart of FIG. 3. The processing is performed to set the GPS information reception/calculation state in the flag circuit 25. The CPU 13 respectively adds the above-mentioned flags to the images, to match the GPS information reception/calculation state with each of the images.

Details of the processing illustrated in the flowchart of FIG. 3 will be described below.

In step S301, the CPU 13 accesses the GPS data memory 19, and determines whether the navigation message data has been received. If the CPU 13 determines that the navigation message data has been received (YES in step S301), the processing proceeds to step S302.

In step S302, the CPU 13 accesses the GPS calculation circuit 23, and determines whether the positional information has been calculated.

If the CPU 13 determines that the positional information has been calculated (YES in step S302), the processing proceeds to step S303. In step S303, the CPU 13 causes the flag circuit 25 to set the flag "11" representing the calculation-completed state, and the processing proceeds to step S308.

On the other hand, if the CPU 13 determines that the positional information has not yet been calculated (NO in step S302), the processing proceeds to step S304. In step S304, the CPU 13 causes the flag circuit 25 to set the flag "10" representing the calculation-in-progress state, and the processing proceeds to step S308. A condition under which the flag "10" is set may include a case where it takes time to calculate the positional information and the processing is not completed.

On the other hand, if the CPU 13 determines that the navigation message data has not yet been received (NO in step S301), the processing proceeds to step S305.

In step S305, the CPU 13 accesses the RF reception block 17, and determines whether the navigation message data is being received.

If the CPU 13 determines that the navigation message data is being received (YES in step S305), the processing proceeds to step S306.

In step S306, the CPU 13 causes the flag circuit 25 to set the flag "01" representing the reception-in-progress state, and the processing proceeds to step S308. A condition under which the flag "01" is set may include a case where it takes time to receive the navigation message data and the processing is not completed.

On the other hand, if the CPU 13 determines that the navigation message data is not being received (NO in step S305), the processing proceeds to step S307.

In step S307, the CPU 13 causes the flag circuit 25 to set the flag "00" representing the reception start wait state, and the processing proceeds to step S308. A condition under which the flag "00" is set may include a case where a satellite cannot be trapped, and a period elapsed until the RF reception block 17 returns from a state where it is stopped for power saving.

In step S308, the CPU 13 finally causes the GPS positioning information addition circuit 27 to add the flag representing the GPS information reception/calculation state to the image. If the flag is added to the image, the processing returns to the flow in FIG. 2.

Figure 7:
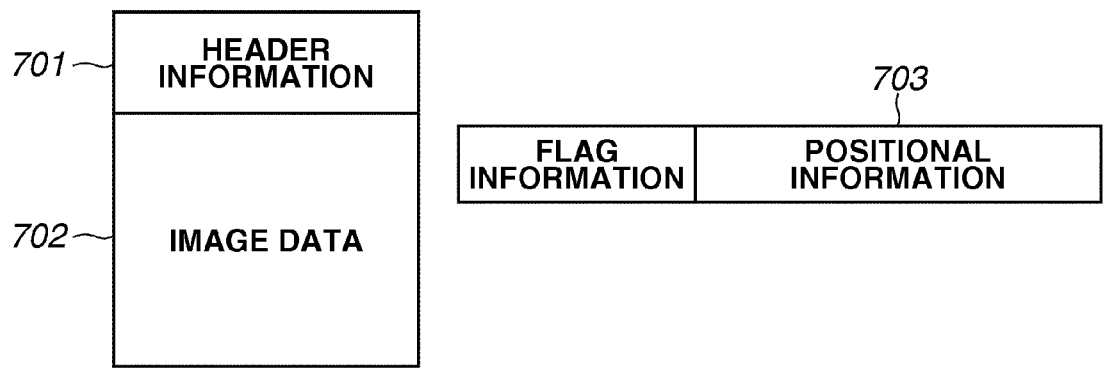
FIG. 7 illustrates a data structure in the first exemplary embodiment and the second exemplary embodiment.

A data structure of an image will be described. FIG. 7 illustrates the data structure of the image. Header information 701 includes information representing imaging conditions such as a date for an image and a shutter speed at which the image has been captured. Image data 702 represents the captured image. A part 703 of the header information 701 stores a flag set in the flag circuit 25 and positional information.

Processes in step S210 and the subsequent steps illustrated in the flowchart of FIG. 2 will be described in four states, i.e., a calculation-completed state, a calculation-in-progress state, a reception-in-progress state, and a reception start wait state.

First, the processes in the calculation-completed state will be described.

In step S210, the CPU 13 accesses the flag circuit 25, to confirm the GPS information reception/calculation state, and determine whether the positional information has been calculated. If the CPU 13 determines that the positional information has been calculated (YES in step S210), the processing proceeds to step S211. More specifically, the CPU 13 determines that the flag "11" is set in the flag circuit 25, the processing proceeds to step S211.

In step S211, the CPU 13 causes the GPS positioning information addition circuit 27 to add the positional information to the image.

In step S212, the CPU 13 then stores the image acquired from the imaging unit 1 in the recording medium 29.

In step S213, the CPU 13 displays a review screen of a captured image on the display unit 39. Thus, the user can confirm the captured image. The CPU 13 displays the image and an icon 501 that is an overlap of a circular icon with an icon representing the GPS satellite on the display unit 39, as illustrated in FIG. 5D. The icon 501 represents the calculation-completed state. Thus, the CPU 13 notifies the user of the GPS information reception/calculation state. This process may be performed in parallel with the process in step S212.

Then, the processing ends.

Second, the processes in the calculation-in-progress state will be described.

If the CPU 13 determines that the positional information has not yet been calculated (NO in step S210), the processing proceeds to step S214. More specifically, if the CPU 13 determines that the flag "11" is not set in the flag circuit 25, the processing proceeds to step S214.

In step S214, the CPU 13 determines whether the positional information is being calculated (the CPU 13 can confirm the GPS information reception/calculation state in a bit state of the flag circuit 25, and thus the number of times of access to the flag circuit 25 may be one).

If the CPU 13 determines that the positional information is being calculated (YES in step S214), the processing proceeds to step S215. More specifically, if the CPU 13 determines that the flag "10" is set in the flag circuit 25, the processing proceeds to step S215. In this case, positional information to be added to an image has not been determined yet. Thus, the CPU 13 cannot add the positional information to the image. Therefore, in step S215, the CPU 13 stores an image having the flag "10" representing the calculation-in-progress state added thereto in the recording medium 29.

In step S216, the CPU 13 then displays a review screen of the captured image on the display unit 39. The CPU 13 displays the image and an icon 502 that is an overlap of a triangular icon with an icon representing the GPS satellite on the display unit 39, as illustrated in FIG. 5C. The icon 502 represents the calculation-in-progress state. Thus, the CPU 13 can notify the user of the GPS information reception/calculation state. This process may be performed in parallel with the process in step S215.

In step S222, the CPU 13 then continuously performs the positional information acquisition processing, to find positional information. When the positional information is found, the processing proceeds to step S223.

In step S223, the CPU 13 adds the positional information to the image, which has been stored in the recording medium 29 in step S215. Then, the processing ends.

Third, the processes in the reception-in-progress state will be described.

If the CPU 13 determines that the positional information is not being calculated (NO in step S214), the processing proceeds to step S217. More specifically, if the CPU 13 determines that the flag "10" is not set in the flag circuit 25, the processing proceeds to step S217.

In step S217, the CPU 13 determines whether the navigation message data is being received (the CPU 13 can confirm the GPS information reception/calculation state in a bit state of the flag circuit 25, and thus the number of times of access to the flag circuit 25 may be one).

If the CPU 13 determines that the navigation message data is being received (YES in step S217), the processing proceeds to step S218. More specifically, if the CPU 13 determines that the flag "01" is set in the flag circuit 25, the processing proceeds to step S218. In this case, positional information to be added to an image has not been determined yet. Thus, the CPU 13 cannot add the positional information to the image. Therefore, in step S218, the CPU 13 stores an image having the flag "01" representing the reception-in-progress state added thereto in the recording medium 29.

In step S219, the CPU 13 then displays a review screen of the captured image on the display unit 39. The CPU 13 displays the image and an icon 503 that is an overlap of a triangular icon with a hollow icon representing the GPS satellite on the display unit 39, as illustrated in FIG. 5B. The icon 503 represents the reception-in-progress state. Thus, the CPU 13 can notify the user of the GPS information reception/calculation state. This process may be performed in parallel with the process in step S218.

In step S222, the CPU 13 then continues the positional information acquisition processing, to find positional information. When the positional information is found, the processing proceeds to step S223.

In step S223, the CPU 13 adds the positional information to the image, which has been stored in the recording medium 29 in step S218. Then, the processing ends.

Fourth, the processes in the reception start wait state will be described.

If the CPU 13 determines that the navigation message data is not being received (NO in step S217), the processing proceeds to step S220. More specifically, if the CPU 13 determines that the flag "01" is not set in the flag circuit 25, the processing proceeds to step S220. In this case, the CPU 13 determines that the GPS information reception/calculation state is the reception start wait state.

In the reception start wait state, positional information to be added to an image has not been determined yet. Therefore, the CPU 13 cannot add the positional information to the image. Therefore, in step S220, the CPU 13 stores an image having the flag "00" representing the reception start wait state added thereto in the recording medium 29.

In step S221, the CPU 13 then displays a review screen of the captured image on the display unit 39. The CPU 13 displays the image and an icon 504 marked a cross mark on the display unit 39, as illustrated in FIG. 5A. The icon 504 represents the reception start wait state. Thus, the CPU 13 can notify the user of the GPS information reception/calculation state. This process may be performed in parallel with the process in step S220.

In step S222, the CPU 13 then continues the positional information acquisition processing, to find positional information. When the positional information is found, the processing proceeds to step S223.

In step S223, the CPU 13 adds the positional information to the image, which has been stored in the recording medium 29 in step S220. Then, the processing ends.

An operation of the camera 101 performed when an instruction to turn off power to the camera 101 is received while positional information is added to an image will be described.

Figure 4:
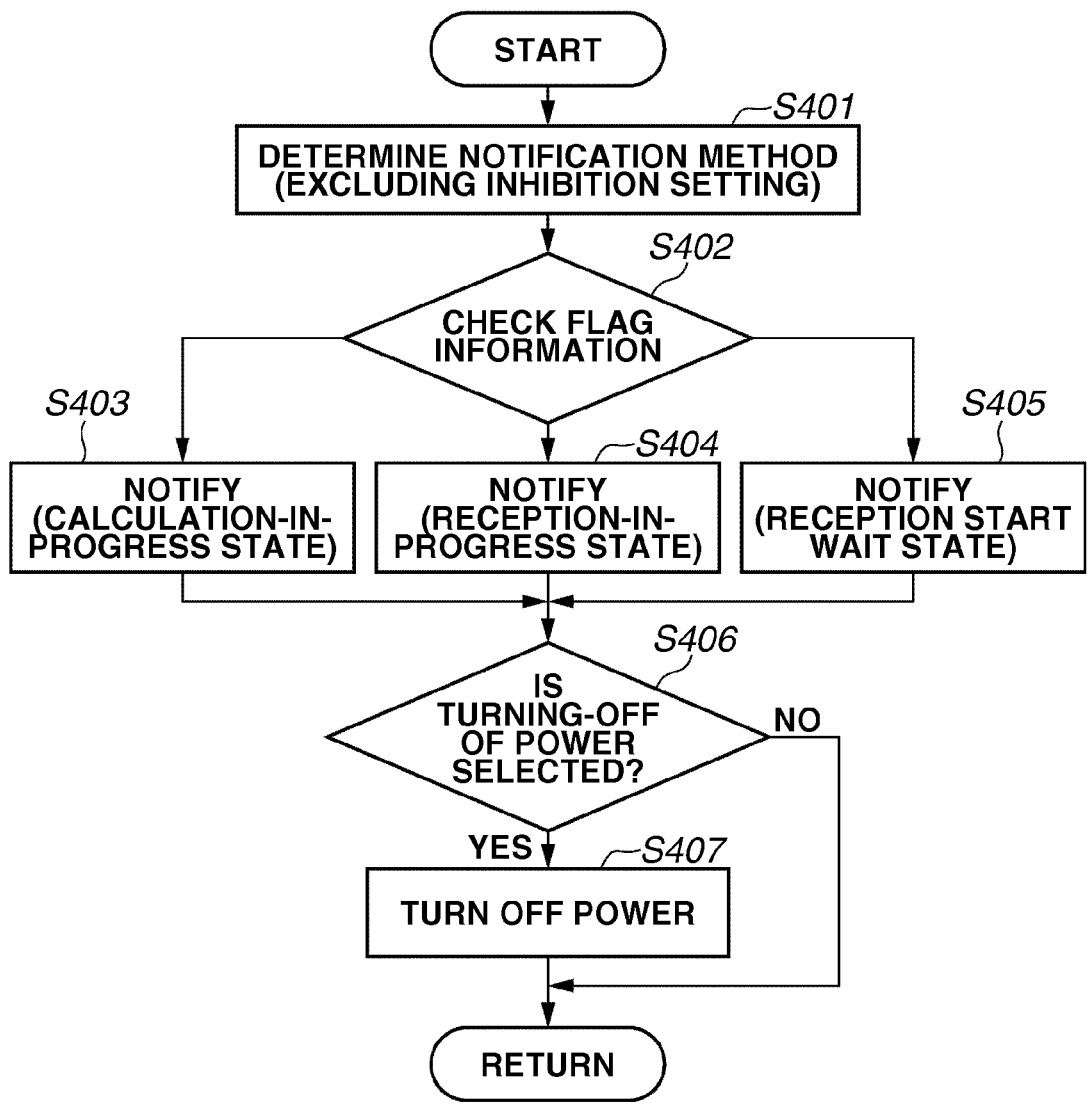
FIG. 4 is a flowchart relating to notification processing in the first exemplary embodiment.

FIG. 4 is a flowchart illustrating the operation of the camera 101 performed when the CPU 13 receives the instruction to turn off the power while the positional information is added to the image. This processing is started in response to receipt of the instruction to turn off the power to the camera 101 when the processes illustrated in steps S214 to S222 are performed. This processing can be performed in parallel with the positional information acquisition processing. The instruction to turn off the power is received when the user operates the operation unit 11, for example.

In step S401, the CPU 13 first determines a method for notifying the user of the GPS information reception/calculation state. In the case, the CPU 13 performs control not to select a method in which an operation is previously set to OFF. An example using the display unit 39 will be described as a notification method. The notification method can also use the speaker 33, the display LED 35, and the vibration element 37.

In step S402, the CPU 13 then accesses the flag circuit 25, to refer to the flag set in the flag circuit 25. Thus, the CPU 13 determines the GPS information reception/calculation state.

If the CPU 13 determines that the GPS information reception/calculation state is "10" representing the calculation-in-progress state, the processing proceeds to step S403.

Figure 6C:
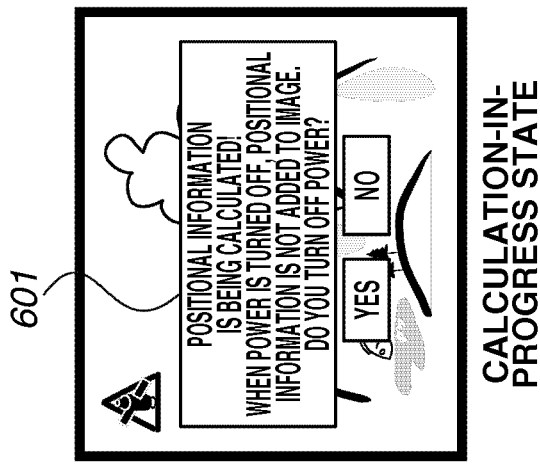
FIGS. 6A to 6C illustrate notification display in the first exemplary embodiment.

In step S403, the CPU 13 displays notification display 601, together with an icon representing the calculation-in-progress state, on the display unit 39, as illustrated in FIG. 6C. Thus, the CPU 13 notifies the user that the positional information has not been added yet. Further, the CPU 13 notifies the user that positional information is required to be calculated to add the positional information. The CPU 13 urges the user to select whether the power is turned off.

The CPU 13 displays buttons marked "YES" and "NO", as illustrated in FIG. 6C, and notifies the user which of the buttons is to be selected. If the user selects "YES", the CPU 13 determines that the user has selected to turn off the power. On the other hand, if the user selects "NO", the CPU 13 determines that the user has selected not to turn off the power. The same is true for FIGS. 6B and 6A, described below. Then, the processing proceeds to step S406.

On the other hand, if the CPU 13 determines that the flag is "01" in step S402, the processing proceeds to step S404. More specifically, if the CPU 13 determines that the GPS information reception/calculation state is the reception-in-progress state, the processing proceeds to step S404.

Figure 6B:
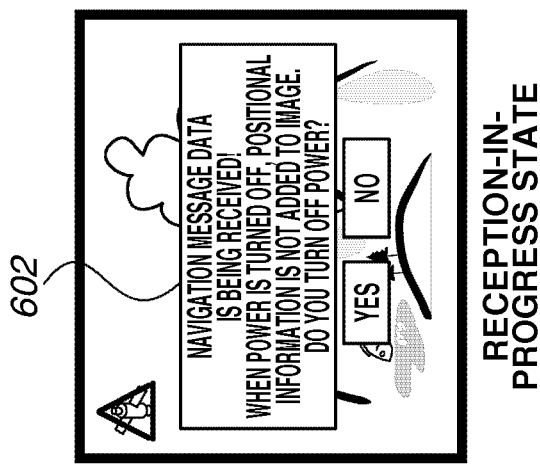

In step S404, the CPU 13 displays notification display 602, together with an icon representing the reception-in-progress state, on the display unit 39, as illustrated in FIG. 6B. Thus, the CPU 13 notifies the user that positional information has not been added yet. Further, the CPU 13 notifies the user that the navigation message data is required to be received to add the positional information. The CPU 13 urges the user to select whether the power is turned off. The processing then proceeds to step S406.

If the CPU 13 determines that the flag is "00" in step S402, the processing proceeds to step S405. More specifically, if the CPU 13 determines that the GPS information reception/calculation state is the reception start wait state, the processing proceeds to step S405.

Figure 6A:
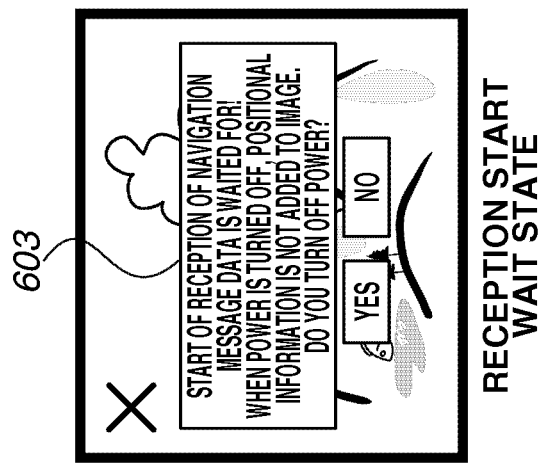

In step S405, the CPU 13 displays notification display 603, together with an icon representing the reception start wait state, on the display unit 39, as illustrated in FIG. 6A. Thus, the CPU 13 notifies the user that positional information has not been added yet. Further, the CPU 13 notifies the user that the navigation message data is required to be received to add the positional information. The CPU 13 urges the user to select whether the power is turned off. The processing then proceeds to step S406.

In step S406, the CPU 13 then determines whether the user has selected to turn off the power as a result of being urged to make the selection in step S404. If the CPU 13 determines that the user has selected to turn off the power (YES in step S406), the processing proceeds to step S407. In step S407, if there are processes currently being performed in parallel with the process in step S406, the processing ends, to turn off the power to the camera 101 according to a predetermined power-off sequence. On the other hand, if the CPU 13 determines that the user has selected not to turn off the power (NO in step S406), the processing returns to the flow in FIG. 2, to continue the processes being performed in parallel.

The operation of the camera 101 performed when the instruction to turn off the power to the camera 101 is received while the positional information is added to the image has been described.

In the present embodiment, if the instruction to turn off the power to the camera 101 is received, the camera 101 notifies the user of the GPS information reception/calculation state using the user interface unit. Thus, the user is notified to which stage processing "receiving of navigation message data and calculation of positional information" is completed. Further, if the user directly turns off the power, the user is notified that positional information is not added to the image. The user can obtain an opportunity to confirm the notification and select whether the power is turned off. The user can confirm to what extent processing for adding the positional information to the image remains. In other words, the user can confirm how long the user is to wait until the positional information is added to the image. The user can select whether the user knows the GPS information reception/calculation state and turns off the power without adding the positional information to the image or the user waits for an operation for turning off the power to add the positional information to the image.

In a second exemplary embodiment, a user is notified of a GPS information reception/calculation state when an operation for sending an image captured by the camera 101 to an external apparatus is received.

Figure 8:
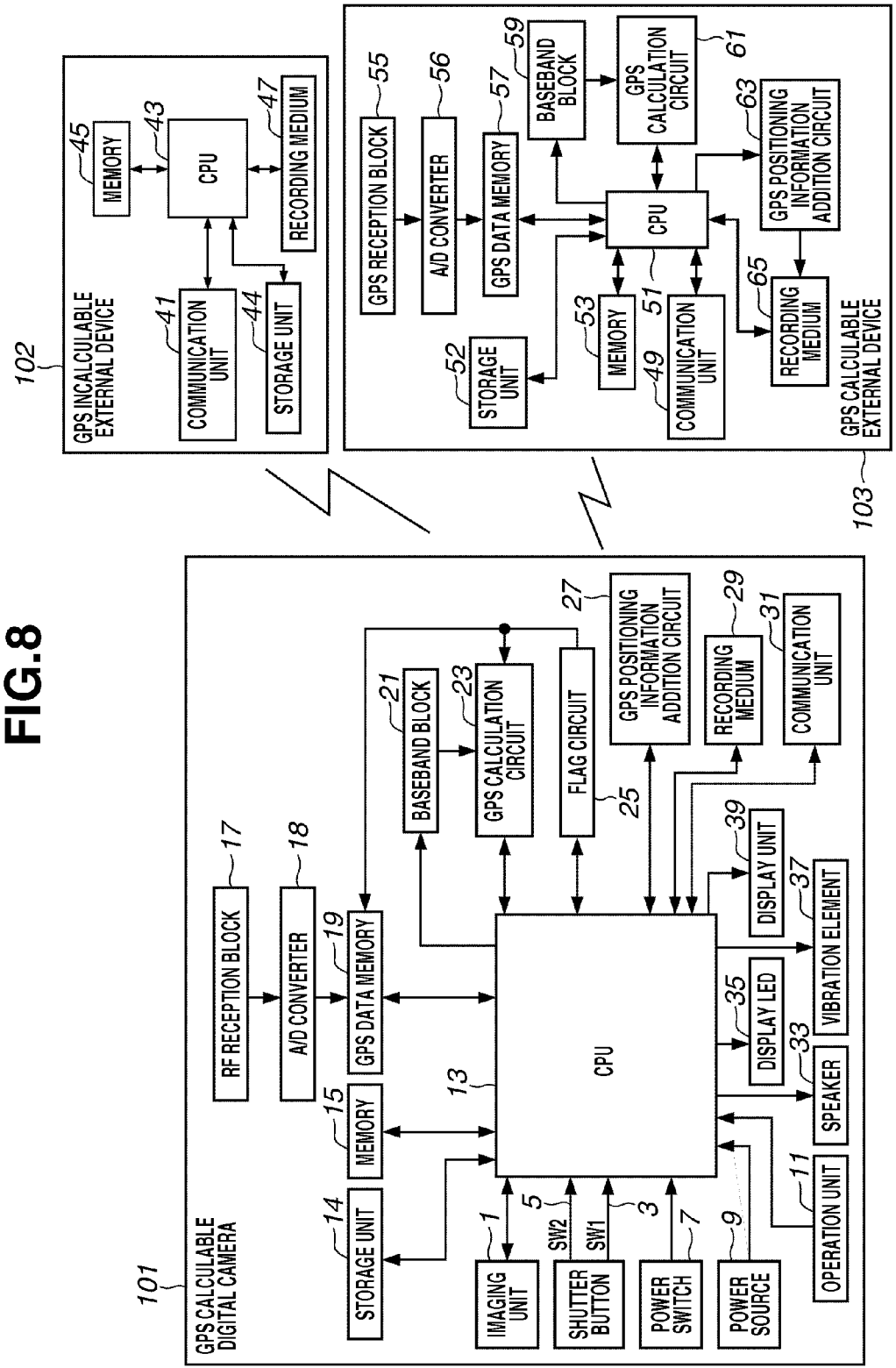
FIG. 8 illustrates a system including an imaging apparatus according to the second exemplary embodiment.

FIG. 8 is a block diagram illustrating an example of a configuration of a system including the camera 101 according to the present exemplary embodiment.

In FIG. 8, the camera 101 can calculate positional information. A configuration of the camera 101 is similar to that in the first exemplary embodiment, and hence description thereof is not repeated. The camera 101 performs processing according to each of the flowcharts illustrated in FIGS. 2 and 3, like in the first exemplary embodiment.

An external apparatus 102 is an external apparatus, which cannot calculate positional information, existing separately from the camera 101. An external apparatus 103 is an external apparatus, which can calculate positional information, existing separately from the camera 101.

Components of the external apparatus 102 will be described below. A communication unit 41 is a wired communication unit or a wireless communication unit for communicating with external apparatuses. A CPU 43 controls the external apparatus 102. A storage unit 44 includes a flash memory or the like. The storage unit 44 stores a program executed by the CPU 43 for controlling each of the components of the external apparatus 102. A memory 45 is used as a work area for the CPU 13. A recording medium 47 is used to record electronic data according to use of the external apparatus 102.

Components of the external apparatus 103 will be described below. A communication unit 49 is a wired communication unit or a wireless communication unit for communicating with external devices. A CPU 51 controls the external apparatus 103. The other components are similar to those of the camera 101. A GPS calculation circuit 61 in the external apparatus 103 can calculate positional information based on navigation message data recorded on an image received via the communication unit 49. The external apparatus 103 may include a flag circuit.

An operation of the camera 101 performed when the CPU 13 receives an instruction to send an image to the external apparatus while the processing illustrated in FIG. 2, described above, is performed will be described below.

FIGS. 9 to 12A and 12B are flowcharts illustrating the operation of the camera 101 performed when the CPU 13 receives the instruction to send the image to the external apparatus while the image is captured.

Figure 9:
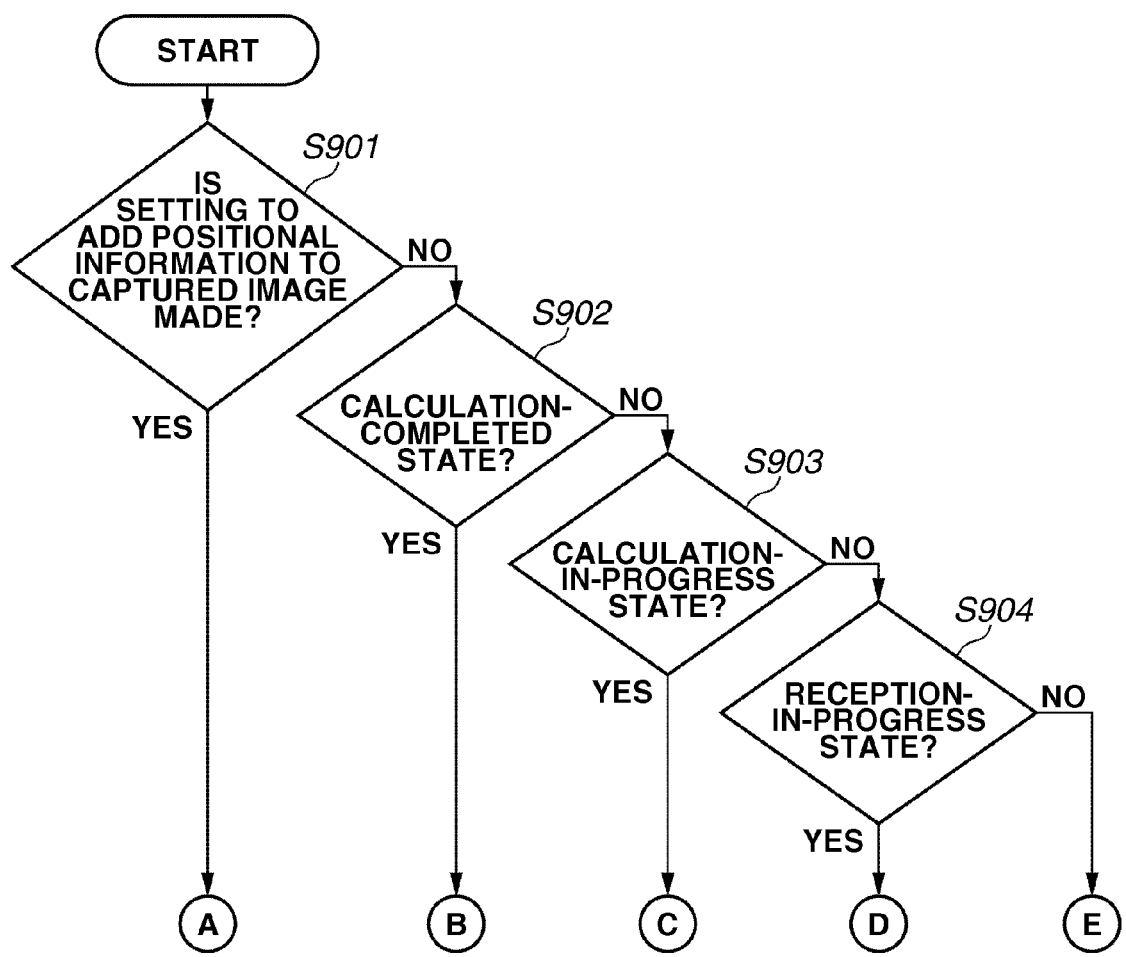
FIG. 9 is a flowchart relating to an operation of the imaging apparatus according to the second exemplary embodiment.

Processing illustrated in FIG. 9 is started in response to receipt of the instruction to send the image to the external apparatus while the processes in step S205 and steps 212 to S222 illustrated in FIG. 2 are performed. This processing is performed in parallel with positional information acquisition processing that has already been performed. The instruction to send the image to the external apparatus may be received by a user's operation of the operation unit 11 or may be received from the external apparatus 102 or 103.

In step S901, the CPU 13 first determines whether setting to add positional information to an image is made.

Figure 10A:
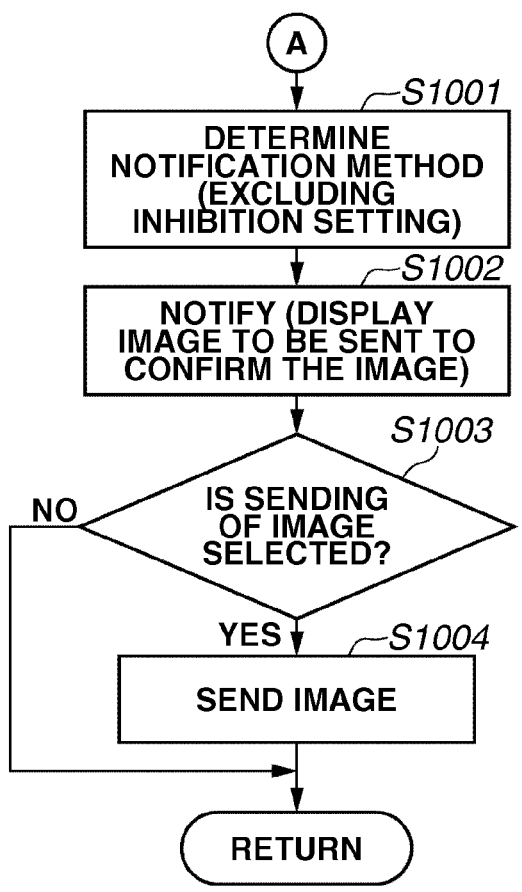
FIGS. 10A and 10B are flowcharts relating to notification processing in the second exemplary embodiment.

If the CPU 13 determines that setting to add the positional information to the image is made (YES in step S901), the CPU 13 performs processing illustrated in the flowchart of FIG. 10A.

On the other hand, if the CPU 13 determines that setting to add the positional information to the image is not made (NO in step S901), the processing proceeds to step S902.

In step S902, the CPU 13 confirms the GPS information reception/calculation state by accessing the flag circuit 25. Thus, the CPU 13 determines whether the GPS information reception/calculation state is the calculation-completed state. If the CPU 13 determines that the GPS information reception/calculation state is the calculation-completed state (YES in step S902), the CPU 13 performs processing illustrated in the flowchart of FIG. 10B. In other words, if the CPU 13 determines that a flag "11" is set in the flag circuit 25, the CPU 13 performs the processing illustrated in the flowchart of FIG. 10B.

If the CPU 13 determines that the GPS information reception/calculation state is not the calculation-completed state (NO in step S902), the processing proceeds to step S903. More specifically, if the CPU 13 determines that the flag "11" is not set in the flag circuit 25, the processing proceeds to step S903.

In step S903, the CPU 13 determines whether the GPS information reception/calculation state is the calculation-in-progress state (the CPU 13 can confirm the GPS information reception/calculation state in a bit state of the flag circuit 25, and thus the number of times of access to the flag circuit 25 may be one). If the CPU 13 determines that the GPS information reception/calculation state is the calculation-in-progress state (YES in step S903), the CPU 13 performs processing illustrated in the flowchart of FIG. 11. In other words, If the CPU 13 determines that a flag "10" is set in the flag circuit 25, the CPU 13 performs the processing illustrated in the flowchart of FIG. 11.

If the CPU 13 determines that the GPS information reception/calculation state is not the calculation-in-progress state (NO in step S903), the processing proceeds to step S904. More specifically, if the CPU 13 determines that the flag "10" is not set in the flag circuit 25, the processing proceeds to step S904.

In step S904, the CPU 13 determines whether the GPS information reception/calculation state is the reception-in-progress state (the CPU 13 can confirm the GPS information reception/calculation state in a bit state of the flag circuit 25, and thus the number of times of access to the flag circuit 25 may be one).

Figure 12A:
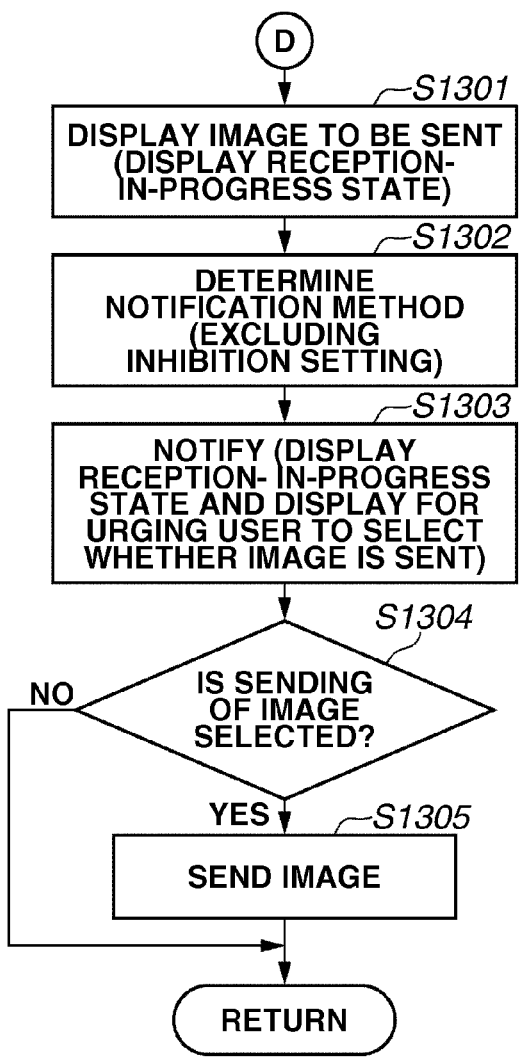
FIGS. 12A and 12B are flowcharts relating to notification processing in the second exemplary embodiment.

If the CPU 13 determines that the GPS information reception/calculation state is the reception-in-progress state (YES in step S904), the CPU 13 performs processing illustrated in the flowchart of FIG. 12A. In other words, if the CPU 13 determines that a flag "01" is set in the flag circuit 25, the CPU 13 performs the processing illustrated in the flowchart of FIG. 12A.

If the CPU 13 determines that the GPS information reception/calculation state is not the reception-in-progress state (NO in step S904), the CPU 13 determines that the GPS information reception/calculation state is the reception start wait state. In this case, the CPU 13 performs processing illustrated in the flowchart of FIG. 12B. More specifically, if the CPU 13 determines that a flag "00" is set in the flag circuit 25, the CPU 13 performs the processing illustrated in the flowchart of FIG. 12B.

The processing illustrated in the flowchart of FIG. 10A is started when the CPU 13 determines that setting to add the positional information to the image is not made in step S901 illustrated in FIG. 9.

In step 1001, the CPU 13 first determines a notification unit for notifying the user of the GPS information reception/calculation state. This process is similar to the process in step S401 illustrated in FIG. 4. In the present exemplary embodiment, a display unit 39 is used as the notification unit.

In step S1002, the CPU 13 then displays an image to be sent on the display unit 39 to confirm the image to be sent. The CPU 13 displays the image to be sent on the display unit 39, as illustrated in FIG. 13F.

In an example illustrated in FIG. 13F, the CPU 13 displays buttons marked "YES" and "NO", and notifies the user to select either one of the buttons. Thus, the user is urged to select whether the displayed image is sent to the external apparatus. If the user selects "YES", the CPU 13 determines that the user has selected to send the image. On the other hand, if the user selects "NO", the CPU 13 determines that the user has selected not to send the image. The same is true for FIGS. 13A to 13E, described below. The processing then proceeds to step S1003.

In step S1003, the CPU 13 determines whether the user has selected to send the image as a result of being urged to make the selection in step S1002. If the CPU 13 determines that the user has selected to send the image (YES in step S1003), the processing proceeds to step S1004. In step S1004, the CPU 13 sends the image to the external apparatus via a communication apparatus 31. Then, the processing returns to the flow in FIG. 2, to continue processes performed in parallel.

On the other hand, if the user has selected not to send the image (NO in step S1003), the CPU 13 does not send the image, and the processing returns to the flow in FIG. 2, to continue the processes performed in parallel.

Figure 10B:
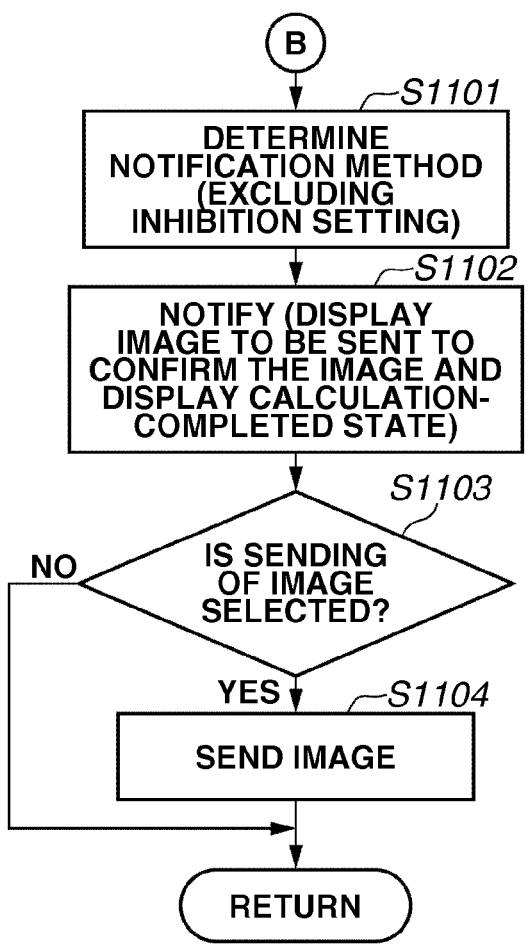

The processing illustrated in the flowchart of FIG. 10B is started when the CPU 13 determines that the GPS information reception/calculation state is the calculation-completed state in step S902 illustrated in FIG. 9.

In step 1101, the CPU 13 first determines a notification unit for notifying the user of the GPS information reception/calculation state. This process is similar to the process in step S401 illustrated in FIG. 4. In the present exemplary embodiment, the display unit 39 is used as the notification unit.

In step S1102, the CPU 13 then displays the image to be sent, together with an icon representing the calculation-completed state, on the display unit 39 to confirm the image to be sent. The CPU 13 displays the image to be sent, as illustrated in FIG. 13E. The processing then proceeds to step S1103.

Processes in steps S1103 and S1104 are similar to those in steps S1003 and S1004, and hence the description thereof is not repeated.

The processing illustrated in the flowchart of FIG. 11 is started when the CPU 13 determines that the GPS information reception/calculation state is the calculation-in-progress state in step S903 illustrated in FIG. 9.

In step 1201, the CPU 13 first displays the image to be sent, together with an icon representing the calculation-in-progress state, on the display unit 39, as illustrated in FIG. 5C.

In step S1202, the CPU 13 acquires device information relating to an external apparatus at a sending destination to which the image is sent via the communication unit 31. The device information relates to a function of the external apparatus, and includes information indicating whether the external apparatus has a function of calculating positional information from the navigation message data added to the image.

In step S1203, the CPU 13 determines whether the external apparatus at the sending destination can calculate the positional information from the navigation message data added to the image based on the device information acquired in step S1202. If the CPU 13 determines that the external apparatus at the sending destination can calculate the positional information from the navigation message data added to the image (YES in step S1203), the processing proceeds to step S1204. In the example illustrated in FIG. 8, if the CPU 13 determines that the external apparatus at the sending destination is the external apparatus 103, the processing proceeds to step S1204.

In step S1204, the CPU 13 determines a notification unit for notifying the user of the GPS information reception/calculation state. This process is similar to that in step S401 illustrated in FIG. 4. In the present exemplary embodiment, the display unit 39 is used as the notification unit.

In step S1205, the CPU 13 then makes notification, as illustrated in FIG. 13D, using the notification unit selected in step S1204. The CPU 13 displays on the display unit 39 a notification that the external apparatus at the sending destination is required to calculate positional information to add the positional information to the image to be sent, together with an icon representing the calculation-in-progress state.

Thus, the CPU 13 can notify the user of the camera 101 that the positional information is being calculated. Further, the CPU 13 can notify, when it sends an image, the user that the external apparatus at the sending destination is required to calculate positional information to add the positional information to the image. Further, the CPU 13 urges the user to select whether the image is to be sent after making the notification. Then, the processing proceeds to step S1208.

In step S1208, the CPU 13 determines whether the user has selected to send the image as a result of being urged to make the selection in step S1205. If the CPU 13 determines that the user has selected to send the image (YES in step S1208), the processing proceeds to step S1209.

In step S1209, the CPU 13 adds the navigation message data to the image, and sends the image to the external apparatus 103. Then, the processing returns to the flow in FIG. 2, to continue the processes performed in parallel.

If the CPU 13 determines that the user has selected not to send the image (NO in step S1208), the processing returns to the flow in FIG. 2, to continue the processes performed in parallel.

On the other hand, if the CPU 13 determines that the external apparatus at the sending destination cannot calculate the positional information (NO in step S1203), the processing proceeds to step S1206. More specifically, in the example illustrated in FIG. 8, if the CPU 13 determines that the external apparatus at the sending destination is the external apparatus 102, the processing proceeds to step S1206.

In step S1206, the CPU 13 determines a notification unit for notifying the user of the GPS information reception/calculation state. This process is similar to that in step S401 illustrated in FIG. 4. In the present exemplary embodiment, the display unit 39 is used as the notification unit.

In step S1207, the CPU 13 then makes notification, as illustrated in FIG. 13C, using the notification unit selected in step S1206. The CPU 13 displays on the display unit 39 a notification that positional information is not added to the image to be sent, together with an icon representing the calculation-in-progress state. Thus, the CPU 13 notifies the user of the camera 101 that the positional information is being calculated. Further, the CPU 13 notifies, when it sends an image, the user that positional information is not added to the image to be sent. Further, the CPU 13 urges the user to select whether the image is to be sent after making the notification. Then, the processing proceeds to step S1208.

In step S1208, the CPU 13 determines whether the user has selected to send the image as a result of being urged to make the selection in step S1207.

If the CPU 13 determines that the user has selected to send the image (YES in step S1208), the processing proceeds to step S1209. In step S1209, the CPU 13 sends the image to the external apparatus 102. Then, the processing returns to the flow in FIG. 2, to continue the processes performed in parallel.

If the CPU 13 determines that the user has selected not to send the image (NO in step S1207), the processing returns to the flow in FIG. 2, to continue the processes performed in parallel.

The processing illustrated in the flowchart of FIG. 12A is started when the CPU 13 determines that the GPS information reception/calculation state is the reception-in-progress state in step S904 illustrated in FIG. 9.

In step S1301, the CPU 13 first displays an icon representing the reception-in-progress state, together with the image to be sent, on the display unit 39, as illustrated in FIG. 5B.

In step S1302, the CPU 13 then determines a notification unit for notifying the user of the GPS information reception/ calculation state. This process is similar to that in step S401 illustrated in FIG. 4. In the present exemplary embodiment, the display unit 39 is used as the notification unit.

In step S1303, the CPU 13 then makes notification, as illustrated in FIG. 13B, using the notification unit selected in step S1302. In the present exemplary embodiment, the CPU 13 displays on the display unit 39 a notification that positional information is not added to the image to be sent, together with an icon representing the reception-in-progress state. Thus, the CPU 13 can notify the user of the camera 101 that the navigation message data is being received. Further, the CPU 13 notifies, when it sends an image, the user that positional information is not added to the image to be sent. Further, the CPU 13 urges the user to select whether the image is to be sent after making the notification. Then, the processing proceeds to step S1304.

In step S1304, the CPU 13 determines whether the user has selected to send the image as a result of being urged to make the selection in step S1303.

If the CPU 13 determines that the user has selected to select the image (YES in step S1304), the processing proceeds to step S1305. In step S1305, the CPU 13 sends the image to the external apparatus. Then, the processing returns to the flow in FIG. 2, to continue the processes performed in parallel.

If the CPU 13 determines that the user has selected not to send the image (NO in step S1304), the processing returns to the flow in FIG. 2, to continue the processes performed in parallel.

Figure 12B:
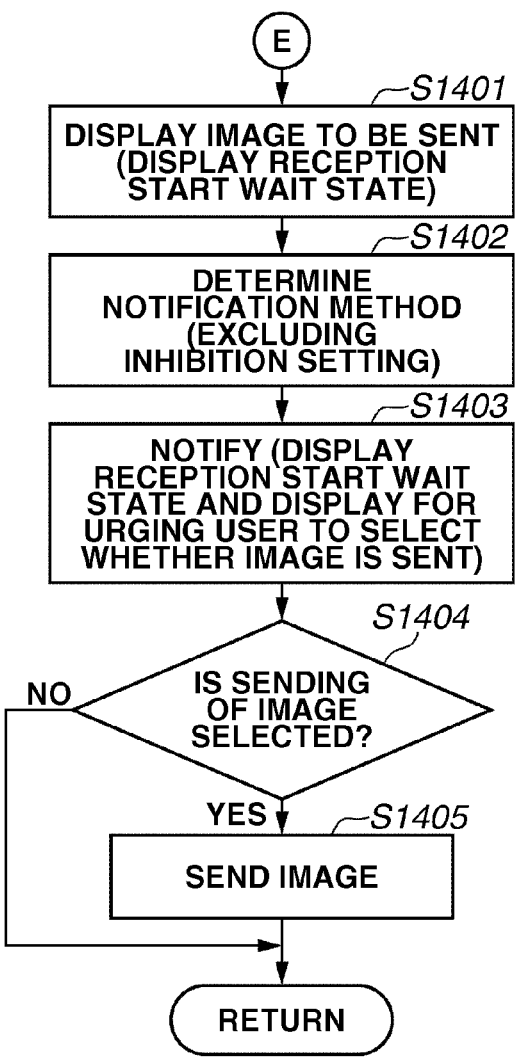

The processing illustrated in the flowchart of FIG. 12B is started when the CPU 13 determines that the GPS information reception/calculation state is the reception start wait state in step S904 illustrated in FIG. 9.

In step S1401, the CPU 13 first displays an icon representing the reception start wait state, together with the image to be sent, on the display unit 39, as illustrated in FIG. 5A.

In step S1402, the CPU 13 then determines a notification unit for notifying the user of the GPS information reception/calculation state. This process is similar to that in step S401 illustrated in FIG. 4. In the present exemplary embodiment, the display unit 39 is used as the notification unit.

In step S1403, the CPU 13 then makes notification, as illustrated in FIG. 13A, using the notification unit selected in step S1402. The CPU 13 displays on the display unit 39 a notification that positional information is not added to the image to be sent, together with an icon representing the reception start wait state. Thus, the CPU 13 notifies the user of the camera 101 that the GPS information reception/calculation state is the reception start wait state. Further, the CPU 13 notifies, when it sends an image, the user that positional information is not added to the image to be sent. Further, the CPU 13 urges the user to select whether the image is to be sent after making the notification. Then, the processing proceeds to step S1404.

In steps S1404 and S1405, similar processes to those insteps S1304 and S1305 illustrated in FIG. 12A are performed, and hence description thereof is not repeated.

In the present embodiment, when an image having no positional information added thereto is sent, an acquisition state of positional information is notified using the user interface unit. Thus, the user is notified to which stage processing "receiving of navigation message data and calculation of positional information" is completed. Further, if the user directly sends the image, the user is notified that positional information is not added to the sent image. The user is notified that the external apparatus receives the image having no positional information added thereto. The user can obtain an opportunity to confirm the notification and select whether the image is sent.

Therefore, the user can know, when the image is sent before the positional information is added thereto, that positional information is not added to the sent image, and select whether the image is to be sent after knowing that.

Further, when the external apparatus at the sending destination of the image can calculate positional information, the user is notified that the positional information can be added to the image in the external apparatus. Thus, the user can know, when the image having no positional information added thereto is sent, that positional information can be added to the image in the external apparatus. The user can confirm the notification, and select whether the image is to be sent.

In the above-mentioned second exemplary embodiment, if the user selects not to send an image, the user is required to input an instruction to send the image once again to send the image. On the other hand, in a third exemplary embodiment, a user can select to automatically send an image the instant positional information is added to the image.

In the present exemplary embodiment, there are portions common to those in the first and second exemplary embodiments. Therefore, description of the common portions is not repeated, and portions specific to the present exemplary embodiment will be described mainly.

A system in the present exemplary embodiment is similar to that in the second exemplary embodiment. A CPU 13 performs processing according to each of the flowcharts illustrated in FIGS. 2, 3, 9, 10A, and 10B, like in the second exemplary embodiment.

The portions specific to the present exemplary embodiment will be described in detail below.

Processing illustrated in the flowchart of FIG. 14 is performed, in place of the processing illustrated in the flowchart of FIG. 11, in a camera 101 according to the present exemplary embodiment.

In steps S1501 to S1504 and S1506, a CPU 13 performs similar processes to those in steps S1201 to S1204 and S1206 illustrated in FIG. 11.

Figure 16A:
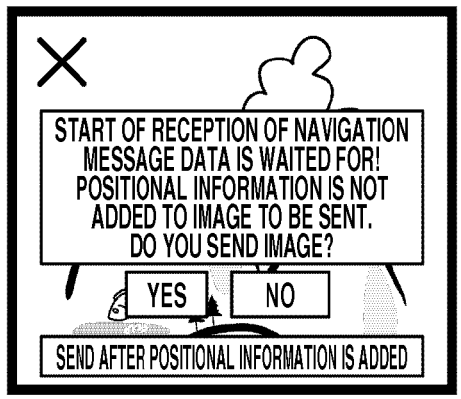
FIGS. 16A to 16D illustrate notification display in the third exemplary embodiment.
Figure 16B:
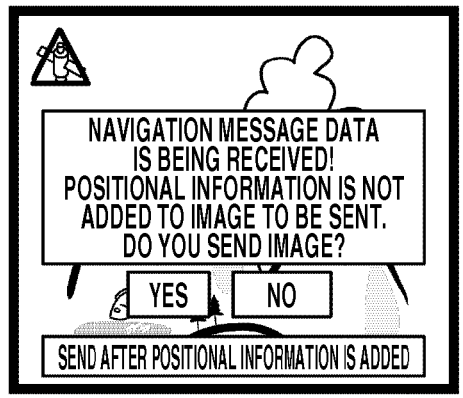
Figure 16C:
Figure 16D:
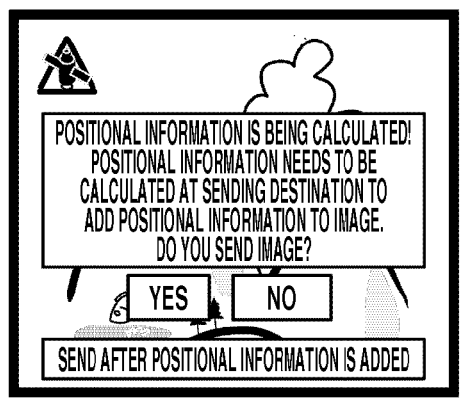

In step S1505, the CPU 13 displays a screen as illustrated in FIG. 16D on a display unit 39. The CPU 13 displays an icon representing the calculation-in-progress state on the display unit 39. Further, the CPU 13 displays on the display unit 39 a notification that an external apparatus at a sending destination is required to calculate positional information to add the positional information to an image to be sent. Thus, the CPU 13 notifies the user that the positional information is being calculated. Further, the CPU 13 notifies, when it sends an image, the user that the positional information is required to be calculated to add the positional information to the image in the external apparatus at the sending destination. In the present exemplary embodiment, the CPU 13 displays buttons marked "YES", "NO", and "SEND AFTER POSITIONAL INFORMATION IS ADDED". Thus, the CPU 13 urges the user to select whether the displayed image is sent or not to the external apparatus, or is automatically sent to the external apparatus after the positional information is added thereto. If the user selects "YES", the CPU 13 determines that the user has selected to send the image. On the other hand, if the user selects "NO", the CPU 13 determines that the user has selected not to send the image. If the user selects "SEND AFTER POSITIONAL INFORMATION IS ADDED", the CPU 13 determines that the user has selected to automatically send the image even after the positional information is added thereto. The same is true for FIGS. 16A to 16C, described below. Then, the processing proceeds to step S1508.

In step S1508, the CPU 13 determines whether the user has selected to send the image as a result of being urged to make the selection. If the CPU 13 determines that the user has selected to send the image (YES in step S1508), the processing proceeds to step S1509.

In step S1509, the CPU 13 adds navigation message data to the image, and sends the image to an external apparatus 103. Then, the processing returns to the flow in FIG. 2, to continue processes performed in parallel.

On the other hand, if the CPU 13 determines that the user has selected not to send the image (NO in step S1508), the processing proceeds to step S1510.

In step S1510, the CPU 13 determines whether the user has selected to automatically send the image after the positional information is added thereto. If the CPU 13 determines that the user has selected to automatically send the image after the positional information is added thereto (YES in step S1510), the processing proceeds to step S1511. Otherwise (NO in step S1510), the processing returns to the flow in FIG. 2, to continue positional information acquisition processing.

In step S1511, the CPU 13 waits until the positional information is added to the image to be sent by the positional information acquisition processing. When the positional information is added to the image, the processing proceeds to step S1509.

In the process performed in step S1507, a screen as illustrated in FIG. 16C is displayed in place of the screen as illustrated in FIG. 16D, which is displayed on the display unit 39 in step S1505.

Figure 15A:
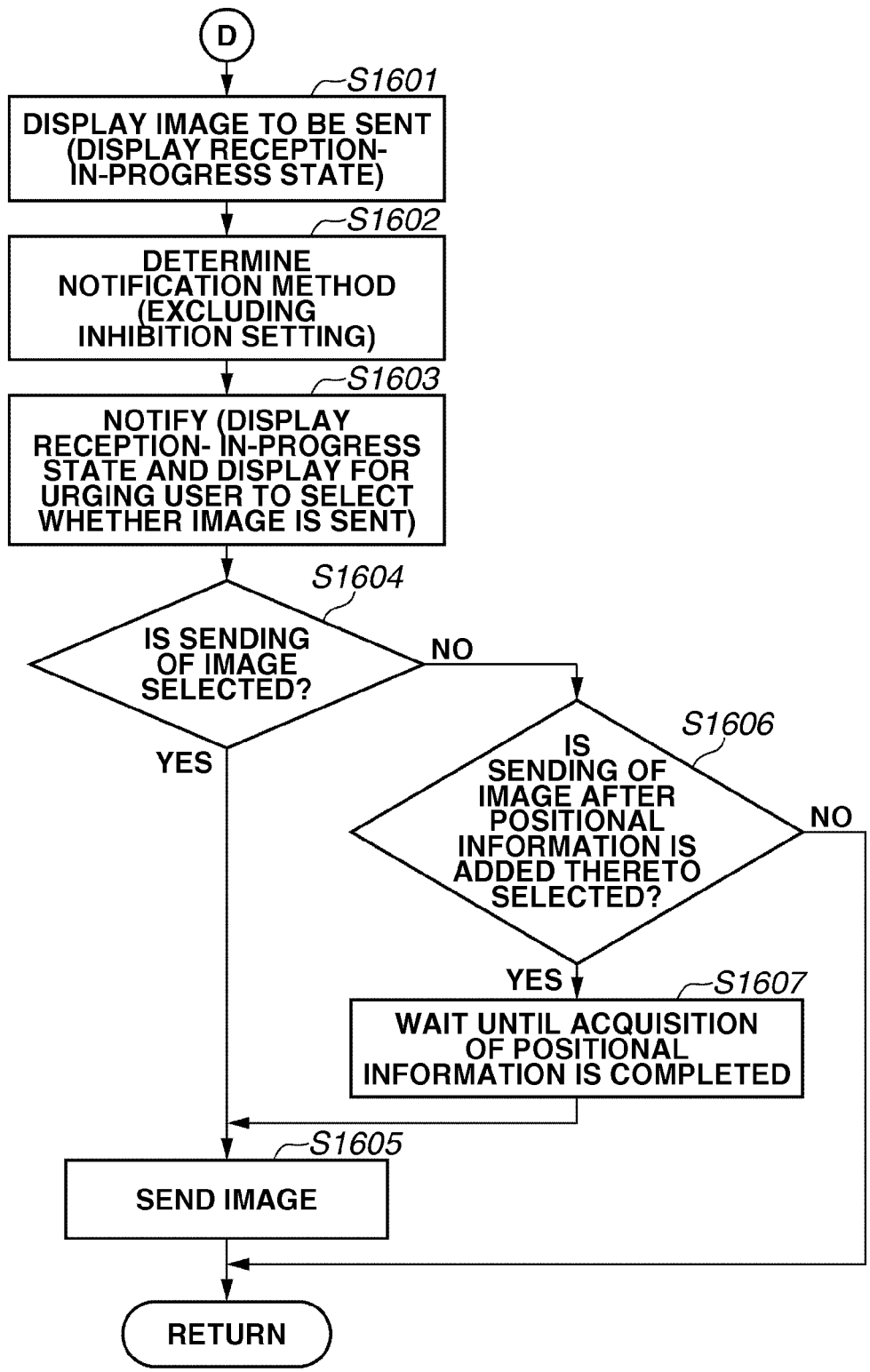
FIGS. 15A and 15B are flowcharts relating to notification processing in the third exemplary embodiment.

Processing illustrated in the flowchart of FIG. 15A is performed, in place of the processing illustrated in the flowchart of FIG. 12A, in the camera 101 according to the present exemplary embodiment.

Processes performed in steps S1601 and S1602 are similar to the processes performed in steps S1301 and S1302, and hence description thereof is not repeated.

In step S1603, the CPU 13 displays a screen as illustrated in FIG. 16B on the display unit 39. This screen is similar to those illustrated in FIGS. 16D and 16C, described above. The processing then proceeds to step S1604. Processes in step S1604 and the subsequent steps are similar to the processes in step S1508 and the subsequent steps illustrated in FIG. 14, and hence description thereof is not repeated.

Figure 15B:
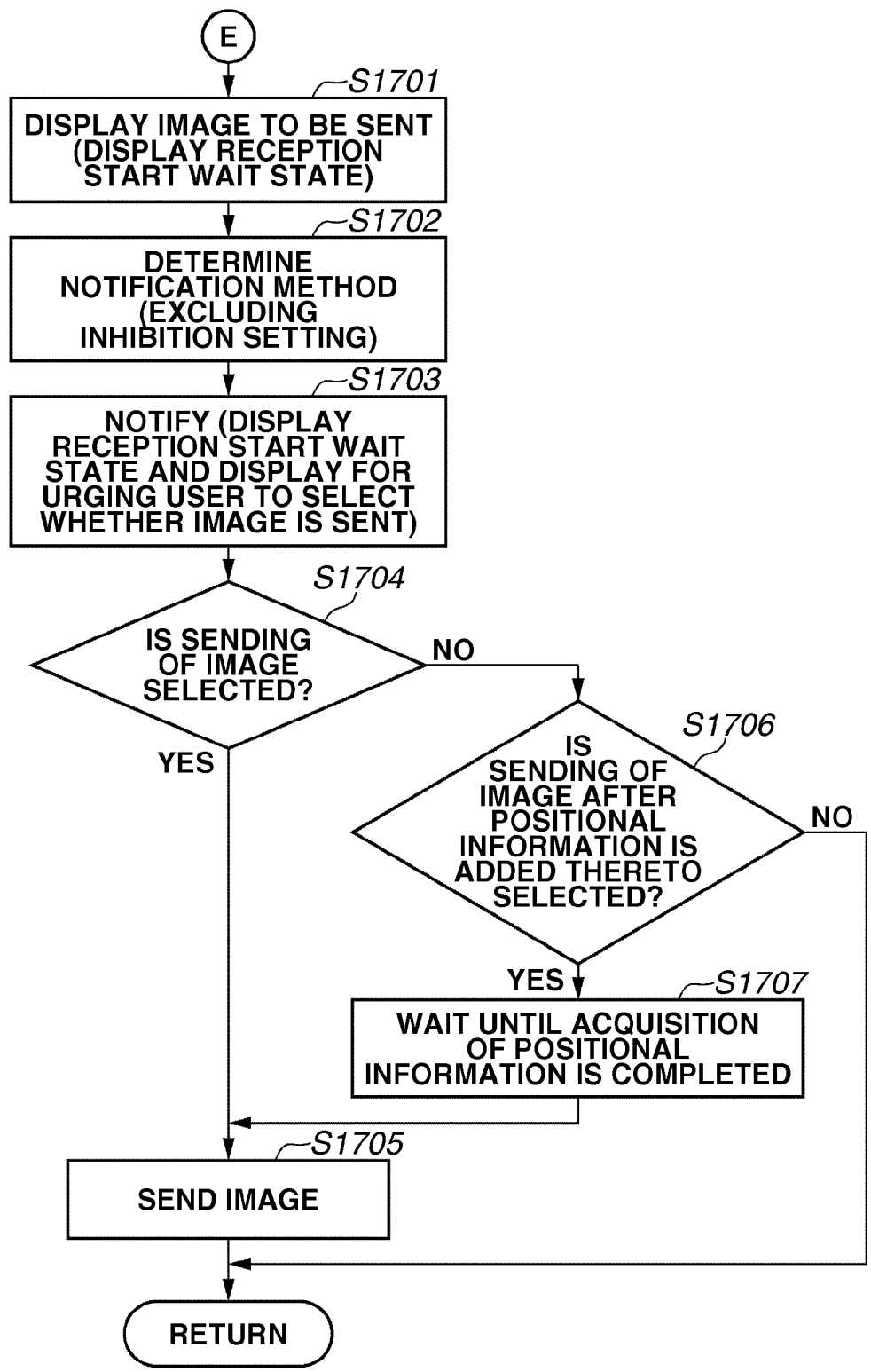

Processing illustrated in the flowchart of FIG. 15B is performed, in place of the processing illustrated in the flowchart of FIG. 12B, in the camera 101 according to the present exemplary embodiment.

Processes in the flowchart are similar to those illustrated in FIG. 15A. In step S1703, a screen as illustrated in FIG. 16A is displayed in place of the screen illustrated in FIG. 16B.

In the present exemplary embodiment, the user can select whether the mage is automatically sent after positional information is added thereto. According to the present exemplary embodiment, time and labor required to repeat an operation for sending an image can be saved.

In the above-mentioned second and third exemplary embodiments, the camera 101 receives an instruction for a user to send an image in whatever state positional information is acquired. If the positional information is presumed to be immediately added to the image, the image may be unable to be sent without positional information being added thereto. For example, in the calculation-in-progress state, the positional information is presumed to be immediately added to the image. In the calculation-in-progress state, the camera 101 may make the user wait by displaying a notification "Positional information is immediately added to an image. Please wait until the addition of the positional information is completed", for example. Further, in this case, the camera 101 may automatically send the image the instant the positional information is added to the image. Alternatively, the camera 101 may receive an instruction to stop sending an image and an instruction to automatically send an image after positional information is added thereto. The image is not sent depending on an acquisition state of the positional information so that an image to which positional information is presumed to be added can be prevented from being immediately sent while positional information is not added thereto.

In the above-mentioned second and third exemplary embodiments, even if the positional information has been added to the image while a screen for selecting whether the user sends the image is displayed, the displayed screen is not changed. If the positional information has been added to the image while the screen for selecting whether the user sends the image is displayed, the CPU 13 may switch the screen into a screen illustrated in FIG. 13E. In this case, the image may be displayed by adding a notification "Addition of positional information to an image is completed", for example, to the image. The camera 101 is thus configured so that a more efficient operation can be performed.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-230725 filed Oct. 13, 2010, which is hereby incorporated by reference herein in its entirety.

What is claimed is:

1. An imaging apparatus capable of communicating with an external apparatus, the imaging apparatus comprising:
    an imaging unit configured to photograph an object to acquire an image;
    an acquisition unit configured to acquire positional information;
    an addition unit configured to add the positional information acquired by the acquisition unit to the image acquired by the imaging unit;
    an operation unit configured to receive an instruction from a user; and
    a control unit configured to cause the imaging apparatus to notify before sending the image, when the operation unit receives an instruction to send the image to the external apparatus after the acquisition unit starts to perform processing for acquiring the positional information and before the addition unit adds the positional information to the image, the user that the positional information has not been added to the image which is instructed to be sent.

2. The imaging apparatus according to claim 1, wherein the operation unit receives an operation for selecting whether the image is sent before the positional information is added to the image, when the control unit causes the imaging apparatus to notify the user that the positional information has not been added to the image which is instructed to be sent.

3. The imaging apparatus according to claim 2, wherein the control unit determines an acquisition state of the positional information,
wherein the control unit causes the operation unit to switch, according to the acquisition state, whether to receive an instruction to send the image to the external apparatus before the positional information is added to the image.

4. The imaging apparatus according to claim 1, wherein the operation unit receives an operation for selecting to automatically send the image after the positional information is added to the image when the control unit causes the imaging apparatus to notify the user that the positional information has not been added to the image which is instructed to be sent.

5. The imaging apparatus according to claim 4, wherein the control unit determines an acquisition state of the positional information,
wherein the control unit causes the operation unit to switch, according to the acquisition state, whether to receive an operation for automatically sending the image after the positional information is added to the image.

6. The imaging apparatus according to claim 1, wherein the control unit determines an acquisition state of the positional information,
wherein the control unit makes a notification content differ depending on the acquisition state.

7. The imaging apparatus according to claim 1, wherein the control unit determines an acquisition state of the positional information,
wherein the acquisition unit includes a reception unit configured to receive a signal from the external apparatus, and a positional information determination unit configured to determine positional information based on the signal received by the reception unit, and
wherein the acquisition state of the positional information includes a state where the reception unit is receiving the signal, a state where the reception unit waits for start of receiving of the signal, a state where the positional information determination unit is determining the positional information, and a state where the positional information determination unit has completed determining the positional information.

8. The imaging apparatus according to claim 1, wherein the control unit causes the imaging apparatus to notify the user of an acquisition state of the positional information.

9. The imaging apparatus according to claim 1, wherein the control unit makes a notification content differ depending on whether the external apparatus includes a unit configured to calculate positional information.

10. The imaging apparatus according to claim 1, wherein the control unit previously sets a notification method used in the notification unit.

11. A method for controlling an imaging apparatus capable of communicating with an external apparatus, the method comprising:
photographing, using a processor, an object to acquire an image;
acquiring, using the processor, positional information;
adding, using the processor, the acquired positional information to the acquired image;
receiving, using the processor, an instruction from a user; and
notifying, using the processor, before sending the image, when an instruction to send the image to the external apparatus is received after processing for acquiring the positional information is started and before the positional information is added to the image, the user that the positional information has not been added to the image which is instructed to be sent.

12. A non-transitory computer-readable storage medium storing a program for causing a computer to perform the method according to claim 11.

* * * * *